(12) United States Patent
Blum et al.

(10) Patent No.: US 8,922,902 B2
(45) Date of Patent: Dec. 30, 2014

(54) DYNAMIC LENS

(75) Inventors: Ronald D. Blum, Roanoke, VA (US); Anthony Van Heugten, Sarasota, FL (US)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 13/050,974

(22) Filed: Mar. 18, 2011

(65) Prior Publication Data

US 2011/0235186 A1 Sep. 29, 2011

Related U.S. Application Data

(60) Provisional application No. 61/382,963, filed on Sep. 15, 2010, provisional application No. 61/366,746, filed on Jul. 22, 2010, provisional application No. 61/326,703, filed on Apr. 22, 2010, provisional application No. 61/317,100, filed on Mar. 24, 2010.

(51) Int. Cl.
*G02B 1/06* (2006.01)
*G02B 3/12* (2006.01)
*G02C 3/00* (2006.01)
*G02C 7/00* (2006.01)
*G02C 7/02* (2006.01)
*G02C 7/08* (2006.01)
*G02B 3/14* (2006.01)

(52) U.S. Cl.
CPC ... *G02C 7/08* (2013.01); *G02B 3/14* (2013.01)
USPC ..................... 359/666; 351/159.68

(58) Field of Classification Search
USPC ........ 359/642, 665–666; 351/159.01, 159.04, 351/159.34, 159.68
See application file for complete search history.

(56) References Cited

U.S. PATENT DOCUMENTS 4,431,262 A  2/1984  Tolles
5,182,585 A  1/1993  Stoner (Continued)

FOREIGN PATENT DOCUMENTS

WO  WO 9941624  8/1999
WO  WO 0175510  10/2001

(Continued)

OTHER PUBLICATIONS

International Search Report cited in PCT/US2011/029419 application.

(Continued)

*Primary Examiner* — James Greece
(74) *Attorney, Agent, or Firm* — Kilpatrick Townsend & Stockton LLP

(57) ABSTRACT

A device and/or apparatus that comprises a dynamic optical lens is provided. A first apparatus includes a first lens component having a first surface and a second surface. The first apparatus further includes a second lens component that comprises a flexible element. The first apparatus also includes a fluid that may be applied between at least a portion of the first lens component and at least a portion of the second lens component. The flexible element of the second lens component is such that it conforms to the first surface of the first lens component when an amount of fluid between the first surface of the first lens component and the second lens component is sufficiently low. The flexible element of the second lens component is also such that it does not conform to the first surface of the first lens component when an amount of fluid between the first surface of the first lens component and the second lens component is sufficiently great.

25 Claims, 22 Drawing Sheets

(56) References Cited

U.S. PATENT DOCUMENTS

| | | | |
|---|---|---|---|
| RE34,251 E * | 5/1993 | Achatz et al. | 623/6.17 |
| 5,440,357 A | 8/1995 | Quaglia | |
| 5,443,506 A | 8/1995 | Garabet | |
| 5,489,302 A | 2/1996 | Skottun | |
| 5,526,067 A | 6/1996 | Cronin et al. | |
| 5,668,620 A | 9/1997 | Kurtin et al. | |
| 5,684,637 A | 11/1997 | Floyd | |
| 5,739,959 A | 4/1998 | Quaglia | |
| 5,774,273 A | 6/1998 | Bornhorst | |
| 5,956,183 A | 9/1999 | Epstein et al. | |
| 5,999,328 A | 12/1999 | Kurtin et al. | |
| 6,069,742 A | 5/2000 | Silver | |
| 6,288,846 B1 | 9/2001 | Stoner, Jr. | |
| 6,618,208 B1 | 9/2003 | Silver | |
| 6,715,876 B2 | 4/2004 | Floyd | |
| 7,142,369 B2 | 11/2006 | Wu et al. | |
| 7,256,943 B1 | 8/2007 | Kobrin et al. | |
| 7,333,272 B2 | 2/2008 | Oh et al. | |
| 7,369,321 B1 | 5/2008 | Ren et al. | |
| 7,452,075 B2 * | 11/2008 | Iuliano | 351/159.18 |
| 7,453,646 B2 | 11/2008 | Lo | |
| 7,553,019 B2 | 6/2009 | Kuiper et al. | |
| 7,594,726 B2 | 9/2009 | Silver | |
| 7,675,686 B2 | 3/2010 | Lo et al. | |
| 7,782,541 B2 | 8/2010 | Oh et al. | |
| 2004/0001180 A1 | 1/2004 | Epstein | |
| 2005/0140922 A1 | 6/2005 | Bekerman et al. | |
| 2006/0077562 A1 | 4/2006 | Silver | |
| 2006/0250699 A1 | 11/2006 | Silver | |
| 2007/0211207 A1 * | 9/2007 | Lo et al. | 351/41 |
| 2007/0263293 A1 | 11/2007 | Batchko et al. | |
| 2008/0019015 A1 | 1/2008 | Fernandez et al. | |
| 2009/0213471 A1 | 8/2009 | Silver et al. | |
| 2010/0039709 A1 | 2/2010 | Lo | |
| 2010/0208194 A1 | 8/2010 | Gupta et al. | |
| 2010/0208195 A1 | 8/2010 | Gupta et al. | |

FOREIGN PATENT DOCUMENTS

| | | |
|---|---|---|
| WO | WO 2006/135960 | 12/2006 |
| WO | WO 2007142602 | 12/2007 |
| WO | WO 2008024071 | 2/2008 |
| WO | WO 2008/045283 | 4/2008 |
| WO | WO 2008/115251 | 9/2008 |
| WO | WO 2009109749 | 9/2009 |
| WO | WO 2009125184 | 10/2009 |

OTHER PUBLICATIONS

U.S. Appl. No. 61/317,100, filed Mar. 24, 2010.
U.S. Appl. No. 61/326,703, filed Apr. 22, 2010.
U.S. Appl. No. 61/366,746, filed Jul. 22, 2010.
U.S. Appl. No. 61/382,963, filed Sep. 15, 2010.

* cited by examiner

US 8,922,902 B2

DYNAMIC LENS

CROSS-REFERENCES TO RELATED APPLICATIONS

This application claims benefit under 35 U.S.C. §119(e) of U.S. provisional patent application No. 61/317,100, filed on Mar. 24, 2010; U.S. provisional patent application no. 61/326,703, filed on Apr. 22, 2010; U.S. provisional patent application No. 61/366,746, filed on Jul. 22, 2010; and U.S. provisional patent application No. 61/382,963, filed on Sep. 15, 2010. The entire disclosure of each of these applications is incorporated herein by reference for all purposes and in their entireties.

BACKGROUND OF THE INVENTION

Optical devices that utilize a fluid (usually within or in contact with a membrane) to adjust or change the optical properties of a lens are known. These devices typically alter the volume or pressure of the fluid to cause the membrane to change its curvature, thus creating an optical interface with greater or less refractive power at that interface. In these devices, an increase in volume of a fluid contributes to an increase of positive (plus) optical power, and a decrease in volume of the fluid contributes to a reduction of positive (pus) optical power and/or increase of minus (negative) optical power.

However, such fluid lenses often have drawbacks that make them less than ideal, particularly for use in daily applications such in eyeglasses, contact lenses, spectacles, or other ophthalmic devices. For instance, these types of fluid lenses typically require a large volume of fluid to effectively increase the optical power to desired levels over a sufficient optical area, making it difficult to include such lenses in ophthalmic devices and in other optical applications. Also, due in part because of the large amount of fluid that may be required, it may take a relatively long amount of time to alter the focus of the fluid lens to a desired amount of optical power because this volume of fluid must be displaced.

In addition, these types of fluid lenses typically have a limited ability to be customized for astigmatic correction for the wide variety of eyeglass or optical prescriptions of wearers or users, and also provide manufacturers with a limited ability to edge and/or shape the fluid lens into the wide variety of shapes and sizes of the various eyeglass fashions available to be worn by a wearer or user. Furthermore, these types of fluid lenses generally have a very limited ability to decenter for the wearer or user's inter papillary distance needed and/or for the fitting height needed. In addition, these fluid lenses provide a limited ability for established wholesale laboratories to process the lenses using their present equipment into the lenses of the correct prescription, shape; size and alignment for the wearer's visual needs and/or requirements.

Moreover, as noted above, the adjustment of the optical power is typically achieved by a change in shape of a membrane, which is difficult to control and maintain, and in some cases (such as when creating parabolic or cylinder shapes) it is extremely difficult to achieve the level of precision desired. Many of these fluid lens have no real safeguard so as to guarantee that it will repeatedly switch to the required optical power for a wearer, meaning that the fluid lens can often over shoot or undershoot the required optical power. If left to the wearer to determine this optical power simply by looking through the fluid lens for clarity, it may also be that case that the wearer will prefer more optical plus or minus optical power than required and therefore over time weaken his or her eyes.

BRIEF SUMMARY OF THE INVENTION

A device and/or apparatus that comprises a dynamic optical lens is provided. A first apparatus includes a first lens component having a first surface and a second surface. The first apparatus further includes a second lens component that comprises a flexible element. The first apparatus also includes a fluid that may be applied between at least a portion of the first lens component and at least a portion of the second lens component. The flexible element of the second lens component comprises a first region. The first region is such that it conforms to the first surface of the first lens component when an amount of fluid between the first surface of the first lens component and the first region is sufficiently low. The first region also does not conform to the first surface of the first lens component when an amount of fluid between the first surface of the first lens component and the second lens component is sufficiently great.

In some embodiments, in the first apparatus described above, the flexible element comprises a second region. The first region of the flexible element of the second lens component may conform to the first surface of the first lens component when the fluid between the first region of the flexible element and the first surface is sufficiently low, while at the same time the second region of the flexible element does not conform to the first surface of the first lens component while the fluid between the second region and the first surface is sufficiently great. In some embodiments, the first apparatus includes a reservoir that may contain the fluid that is not located between the first and the second lens components. In some embodiments, the fluid may be applied between the first and second lens components by an actuator.

In some embodiments, in the first apparatus described above the first surface further comprises a first optical feature. Preferably, the first region of the flexible element of the first apparatus conforms to the first optical feature when an amount of fluid between the first optical feature and the flexible element is sufficiently low. Preferably, the first region of the flexible element of the first apparatus does not conform to the first optical feature when an amount of fluid between the first optical feature and the first region of the flexible element is sufficiently great. In some embodiments, the optical feature may comprise any one of, or some combination of, the following: a progressive optical power region; a bifocal; a trifocal; a multi-focal region; an aspherical optical feature; an aspheric region; a rotationally symmetric optical feature; and a non-rotationally symmetric optical feature.

In some embodiments, the first apparatus as described above further includes a first dynamic optical power region. In some embodiments where the first surface of the first lens component includes an optical feature and the first apparatus includes a first dynamic optical power region, the fluid may have an index of refraction that is substantially similar to the index of refraction of the first lens component. Preferably, the index of refraction of the fluid such that the first optical feature does not contribute to the first dynamic optical power region when an amount of the fluid between the first optical feature and the first region of the flexible element is sufficiently great.

In some embodiments, the first surface of the first lens component of the first apparatus as described above defines a first optical power stop. Preferably, the first optical power stop defines a near vision optical power. Preferably, in embodiments where the first lens component comprises a first optical feature, the first dynamic optical power region is defined by the first optical feature when the fluid between the first optical feature and the first region of the flexible element is sufficiently low.

In some embodiments, where the first apparatus described above includes a first dynamic optical power region, the first dynamic optical power region is tunable. Preferably, when an amount of fluid between the first optical feature and the first region of flexible element is sufficiently low; the dynamic optical power region is defined by the first optical power stop. As the amount of fluid between the first optical feature and the first region of the flexible element is increased, the dynamic optical power region tunes away from the first optical power stop.

In some embodiments, where the first apparatus described above includes a first dynamic optical power region, a decrease in the volume of fluid between the first lens component and the first region of the flexible element of the second lens component increases a positive optical power of the dynamic optical power region. In some embodiments, a decrease in the volume of fluid between the first lens component and the first region of the flexible element of the second lens component decreases a positive optical power of the dynamic optical power region.

In some embodiments, in the first apparatus as described above, the shape of at least a portion of the second lens component is adjustable based on the amount of fluid between the first lens component and the second lens component. Preferably, the second lens component comprises a flexible membrane. Preferably, the flexible membrane comprises biaxially oriented polyethelene terephthalate (available under the trade name Mylar) or urethane. In some embodiments, in the first apparatus as described above, at least a portion of the second lens component is stretchable. In some embodiments, the second lens component or a region thereof is translucent. In some embodiments, the second lens component or a region thereof is transparent. Preferably, the second lens element, or a region thereof, transmits at least 85% of light waves that are incident to a surface. More preferably, the second lens element or a region thereof transmits at least 90% of light waves that are incident to a surface.

In some embodiments, in the first apparatus as described above, the first lens component has a first index of refraction, the second lens component has a second index of refraction, and the fluid has a third index of refraction. In some embodiments, the first index of refraction is substantially the same as the second index of refraction. In some embodiments, the first index of refraction is substantially the same as third index of refraction. In some embodiments, the first, the second, and the third index of refraction are substantially the same.

In some embodiments, the first apparatus as described above includes a third lens component having a first surface and a second surface. Preferably, the first lens component and the third lens component are positioned such that a gap exists between the first surface of the first lens component and the first surface of the third lens component. Preferably, at least a portion of the second lens component conforms to at least a portion of the first surface of the third lens component when an amount of the fluid substantially fills the gap between at least a portion of the first lens component and at least a portion of the third lens component. In some embodiments, the first surface of the third lens component defines a second optical power stop. In some embodiments, the second optical stop power stop is for a distance vision optical power.

Embodiments described herein allow for a dynamic lens comprising a fluid that addresses some or all of the deficiencies described above. Embodiments may utilize a fluid which may be added (e.g. applied) or removed from between a first and a second lens component. The first lens component may comprise a first surface having an outer curvature that defines an optical power. The optical power may have any value, including positive value, negative value, and zero value. The second lens component may comprise a flexible element (e.g. a membrane) that has at least a first region that conforms to the outer curvature of the first lens component when the fluid between the first surface and the first region of the flexible element is sufficiently low.

When the fluid is substantially removed from between the first lens component and the first region of the flexible element, the first region of the flexible element comes into contact with and/or conforms to the outer curvature of the first lens component. When this occurs, the optical power of the dynamic lens (or a region thereof) may be defined by the curvature of the outer surface of the first lens component. This is, any remaining fluid is insignificant in that it does not materially contribute to the dynamic optical power region, and the first region of the flexible element has conformed substantially to have the same curvature as the outer curvature of the first lens component. An index matched fluid may also be used so that when the amount of fluid is sufficiently great in the gap between the first and second lens components, any optical feature on the first surface does not contribute to the optical power of the lens.

Therefore, while comprising a fluid, embodiments may utilize the outer curvature of the first lens component (which may or may not include an optical feature or features), rather than an increase in the volume of fluid in the lens, to add positive (plus) optical power and/or to define the optical power needed for near vision. Moreover, this outer curvature may serve as a curvature template which dictates the dynamic increase of positive (plus) optical power of the dynamic lens.

DETAILED DESCRIPTION OF THE INVENTION

Figure 1:
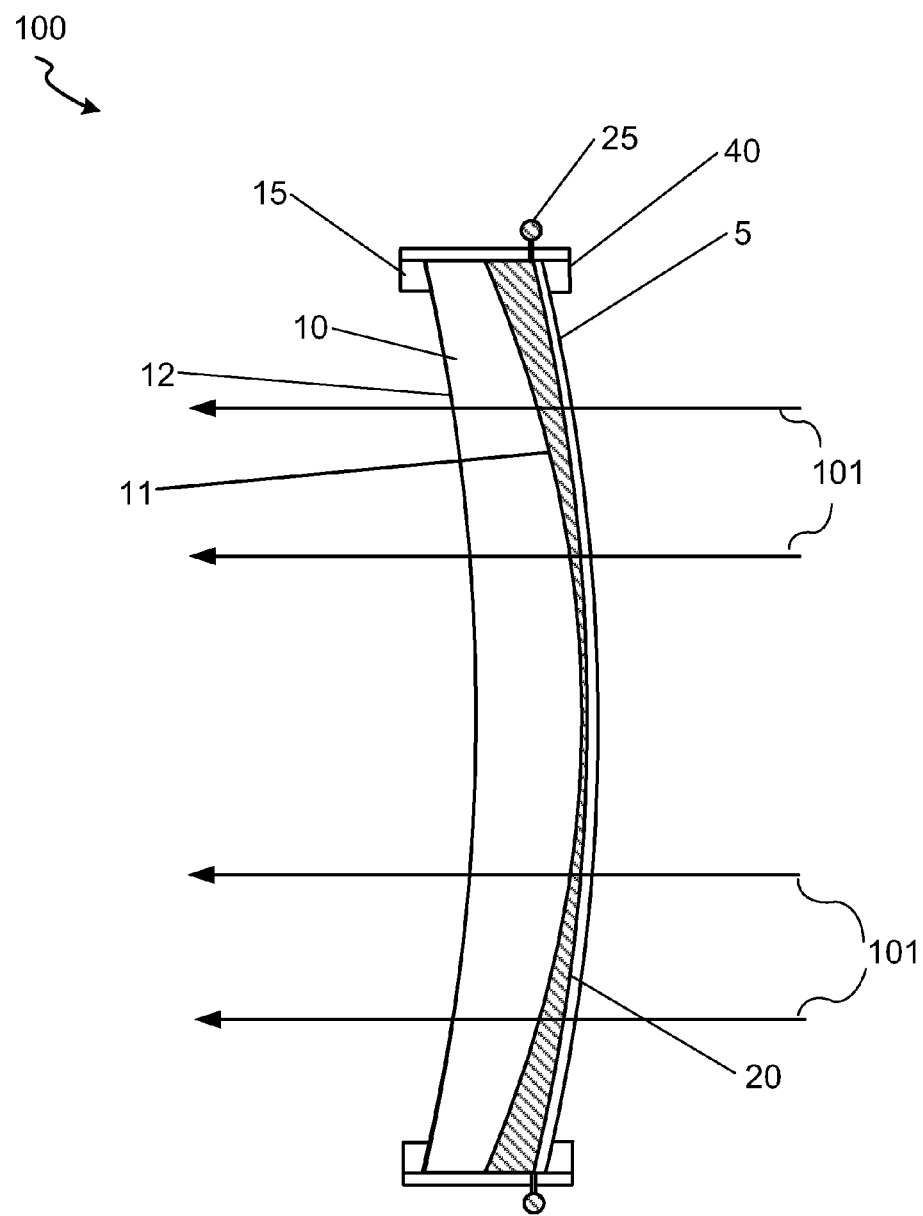
FIG. 1 shows a side view of an exemplary embodiment of a dynamic lens.

Embodiments of the present invention provide a device or apparatus comprising a dynamic lens. Embodiments of a dynamic lens described herein may utilize a fluid in combination with various other optical components, including fixed or rigid optical components and a flexible element (e.g. a flexible membrane), to provide the ability for the lens to obtain multiple optical powers reliably and accurately. Embodiments of the apparatus may thereby provide some of the benefits of traditional dynamic lenses (e.g. permitting multiple optical powers for a single lens), while providing some of the benefits of fixed lenses (e.g. permitting a desired optical power to readily be achieved and easy manufacture of prescription lenses).

Some terms that are used herein are described in further detail as follows:

As used herein, the term "optical power stop" refers to a lens component or surface that serves as a "stop" or boundary that will not allow a desired optical power to be exceeded or, in the case of a minimum optical power, the optical stop will prevent the optical power from going below that value. That is, in a dynamic lens, the optical power stop may define the maximum or minimum amount of positive (or negative) optical power. This may comprises a rigid lens component or a surface thereof. As used herein, the term "curvature template" refers to a curvature of a surface of a lens component to which a flexible element (e.g. a membrane) may conform to. Such curvature may define an optical power stop, and therefore provide the precise curvature needed for an optical power.

As used herein, the term "sufficiently low" refers to an amount of fluid that, when located between a first surface of a lens component and a first region of the flexible element (e.g. a membrane), the amount of fluid does not materially affect the shape of the first region of the flexible element such that the first region of the flexible element may substantially conform to the first surface of the lens component. The fluid also does not appreciably affect the optical power of the apparatus. This term is meant to encompass the fact that it is practically nearly impossible to remove all of the fluid particles from any apparatus (or a gap/chamber thereof) and therefore it is likely that a minimal amount of fluid particles may still exist when in the area between the first lens component and the first region of the flexible element (e.g. some residue may remain at least on the surfaces). However, when referred to as "sufficiently low," the amount of fluid is insubstantial to the functionality of the apparatus.

In contrast, as used herein the term "sufficiently great" (or "sufficiently high") refers to an amount of fluid that is enough to "cover" a lens surface and/or an optical feature thereof (i.e. the fluid is in optical communication with that part of the surface) such that, when the fluid is index matched to a lens component, the portion of the lens surface does not materially add (positive or negative) optical power to an optical dynamic region. Thus, there may be a small amount of fluid (or fluid residue) on a surface without "covering" that portion of the lens, as used herein.

Embodiments provide for a dynamic lens comprising a fluid that may solve/satisfy some or all of the significant unmet needs noted above. While embodiments disclosed herein utilize a fluid, it is the outer curvature of a first lens surface (which may be rigid and which may or may not include an optical feature) of a first lens component to which a first region of a flexible element (e.g. a membrane) conforms in curvature, and not that of an increased fluid volume, that may add positive (plus) optical power and/or optical power needed for near vision correction. In some embodiments, the first region of the flexible element comprises only a portion of the flexible element. In some embodiments, the flexible element may comprise the entire flexible element. In some embodiments, the first region may comprise multiple portions of the flexible element that may or may not be physically connected (e.g. a continuous region of the flexible element).

In some embodiments, the front surface of the lens (e.g. surface 11 in FIG. 1, which is the surface of the first lens component that is further from the viewer) is the first surface that may serve as a curvature template that dictates the dynamic increase of positive (plus) optical power. In some embodiments when the flexible element 5 is located on the side of the lens closest to the eye, a back surface (e.g. surface 12 in FIG. 1, which is the surface of the first lens component that is closer to the viewer) is the first surface that may serve as a curvature template. In such embodiments, the front surface (e.g. surface 11 in FIG. 1) is the second surface, which may be the convex surface opposite the side of the lens comprising the flexible element.

As noted above, conventional fluid lenses provide for an increase in volume of fluid that presses on a membrane to cause an increase in positive (plus) optical power. Should this volume increase be too great or too little, the positive (plus) optical power can be something that is suboptimal for the near focus/near vision correction needs of the wearer. In contrast, embodiments taught herein provide a curvature template such as to allow for a precise optical power stop that will not allow for an optical dynamic lens to provide incorrect optical power for near point focus or near point vision correction of the wearer. Thus, embodiments may provide that each time the near point optical power/near vision correction is required, the dynamic lens may provide the precise and proper optical power required for the wearer.

Figure 16:
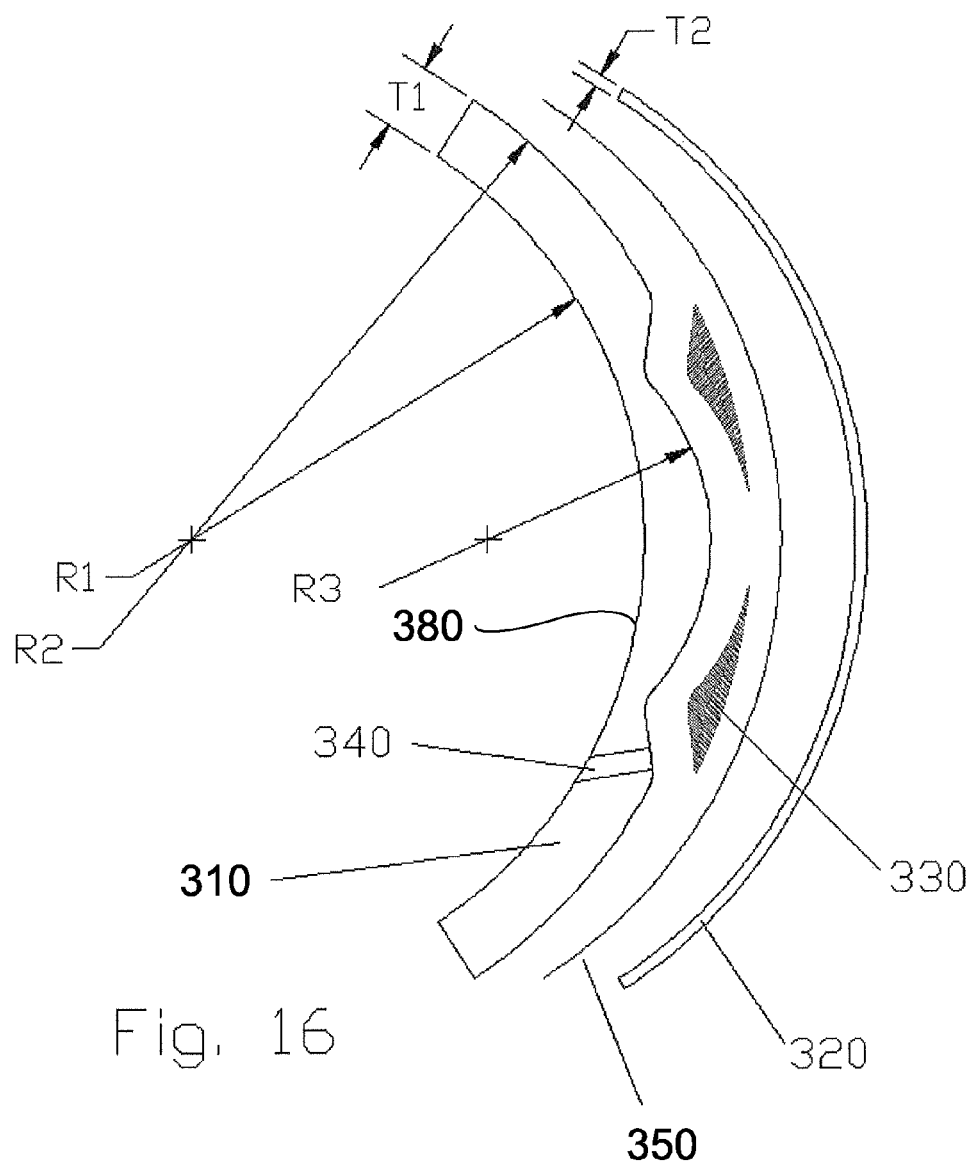
FIG. 16 shows a side view of an exemplary embodiment of a dynamic lens.

In some embodiments, the dynamic lens may also include a cover (e.g. a third lens component such as 320 in FIG. 16). The cover or cover lens may also serve as a curvature template providing an optical power stop for ensuring that a distance optical power is precisely achieved. In some embodiments, a cover may serve as the distance curvature template and the first surface of a lens component (e.g. surface 11 in FIG. 1), which may or may not include an optical feature, may serve as the near vision curvature template (and may or may not also include an intermediate curvature template) by providing an optical power stop for near vision optical power. The first surface may also provide an intermediate vision optical power. Therefore, in some embodiments, the distance vision optical power, intermediate optical power (when desired), and the near vision optical power may be repeatedly and precisely achieved upon focusing on a distance vision object and switching focus to that of an intermediate distance object and then to a near vision object, or any combination thereof.

This is due, in part, because embodiments do not rely on changing the shape of a membrane using the precise amount of fluid each time, because the first surface of the first lens component and/or third lens component serve as optical power stops for the desired corrections. It should be noted, however, that embodiments of the dynamic lens herein also may provide for tuning the optical power of a dynamic optical region away from an optical power stop, or tuning between optical power stops.

A device and/or apparatus that comprises a dynamic optical lens is therefore provided. A first apparatus includes a first lens component having a first surface and a second surface. The first lens component may be rigid; that is, it may be made of a material such that the curvature and shape of its surfaces do not change. Any material may be used that has these features, including glass, plastic, and/or any other transparent rigid materials. The first surface and/or the second surface may be finished, such as free formed or digitally surfaced.

The first apparatus further includes a second lens component that comprises a flexible element. The flexible element may comprise a membrane. In some embodiments, the second lens component may comprise both a flexible component and a rigid component. The flexible element may comprise any material, including biaxially oriented polyethelene terephthalate (available under the trade name Mylar) or urethane. However, any suitable material may be used such that a first region of the second lens component may conform to the first surface of the first lens component. In some embodiments, in the first apparatus as described above, the second lens component (and/or the first region) may also be stretchable. This may permit the second element (and/or the region) to retain some structure, while still conforming to the first surface of the first lens component. The ability to conform to the first surface may result in the optical features thereon defining an optical power of the lens when the fluid is sufficiently low in that region. That is, because the first region of the flexible element does not maintain its own curvature, and conforms to the curvature of the first surface, the curvature of the first surface will may thereby define the optical power of the lens.

In some embodiments, the flexible element of the second lens component or a region thereof is translucent. In some embodiments, the flexible element or a region thereof is transparent. A transparent flexible element may be preferred for applications where the user will be utilizing the lens in daily use, such as in a spectacles, because the lens will allow the user to view objects without much obstruction from this lens component. Preferably, the second lens element or a region thereof transmits at least 85% of light waves that are incident to a surface. More preferably, the second lens element or a region thereof transmits at least 90% of light waves that are incident to a surface. It is desirable that the flexible element does not unnecessarily inhibit the propagation of light waves so that the dynamic lens, or a region thereof, may be used in high light, as well as low light environments.

The first lens component and the second lens component are located such that a gap or chamber may be created between at least a portion of the two components. In some embodiments, a portion of the flexible element may be permanently adhered to the first surface of the first lens component. This may create a seal around a dynamic optical region in which the optical power may be varied. In some embodiments, the second lens component may be adhered to a fixed portion of the first apparatus. However, this may not be preferred because it may inhibit the ability to shape the lens into frames of different styles.

The first apparatus also includes a fluid that may be applied between at least a portion of the first lens component and at least a portion of the second lens component (e.g. in the gap described above). The fluid may be of any composition, and may also include other forms of matter such as a gas and/or gel. The fluid may have any index of refraction, however, in some embodiments, it is preferred that the fluid is index matched with first lens component. The term "index matched," as used herein, means that the indexes of refraction are substantially similar. For example, the indexes of refraction may be with 0.05 units of each other.

In the first apparatus, as noted above the flexible element of the second lens component may comprise a first region that conforms to the first surface of the first lens component when an amount of fluid between the first surface of the first lens component and the first region of the second lens component is sufficiently low, where the term "sufficiently low" was defined above. That is, when the fluid that is located in the gap between the first lens component and the first region of the flexible element is removed (or substantially removed), the first region of the flexible element may come into contact with and/or conform to the first surface of the first lens component. In this way, the first region of the flexible element takes the form of the first surface and any optical feature thereon. If the indexes of refraction of the flexible element and the lens component are substantially the same, than the optical region may have an optical power that is defined by the first surface of the first lens component. In this manner, embodiments provide the ability to consistently and reliably return to the optical power defined by the first surface.

In the first apparatus, the first region of the flexible element of the second lens component also does not conform to the first surface of the first lens component when an amount of fluid between the first surface of the first lens component and the first region of the second lens component is sufficiently great. That is, when the fluid is applied or located in the gap or chamber between the first lens component and the first region of the flexible element, the first region of the flexible element may be displaced by the fluid (or otherwise moved away from the first surface) such that it no longer is in contact with and/or conforms to the first surface. This may therefore provide the dynamic lens with the ability to change the optical power of a particular region. In embodiments where the fluid is indexed matched to the first lens component, an optical feature or the curvature of the first lens surface may no longer contribute to the optical power in any region where the fluid is sufficiently great.

Figure 13:
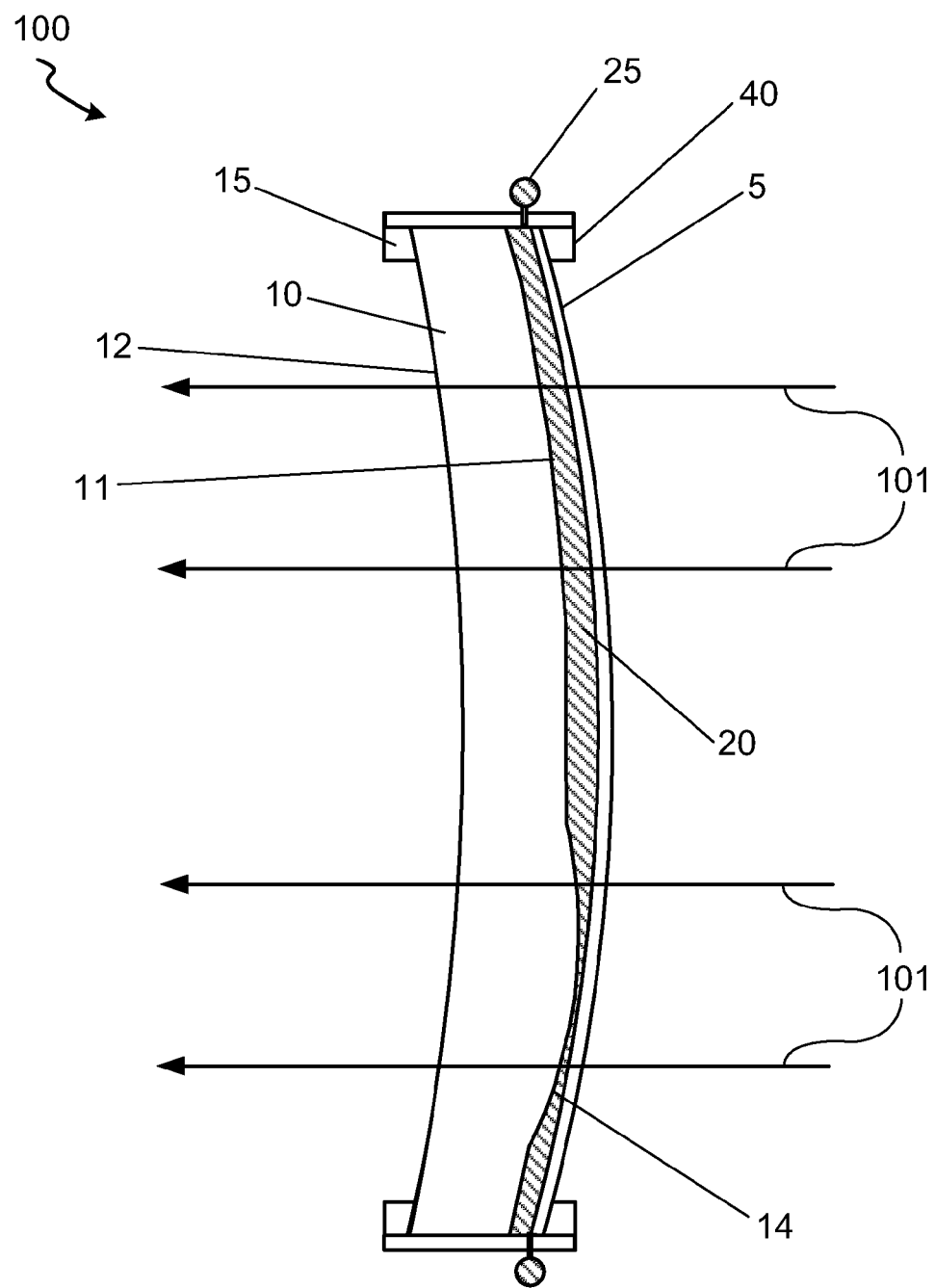
FIG. 13 shows a side view of an exemplary embodiment of a dynamic lens.
Figure 14:
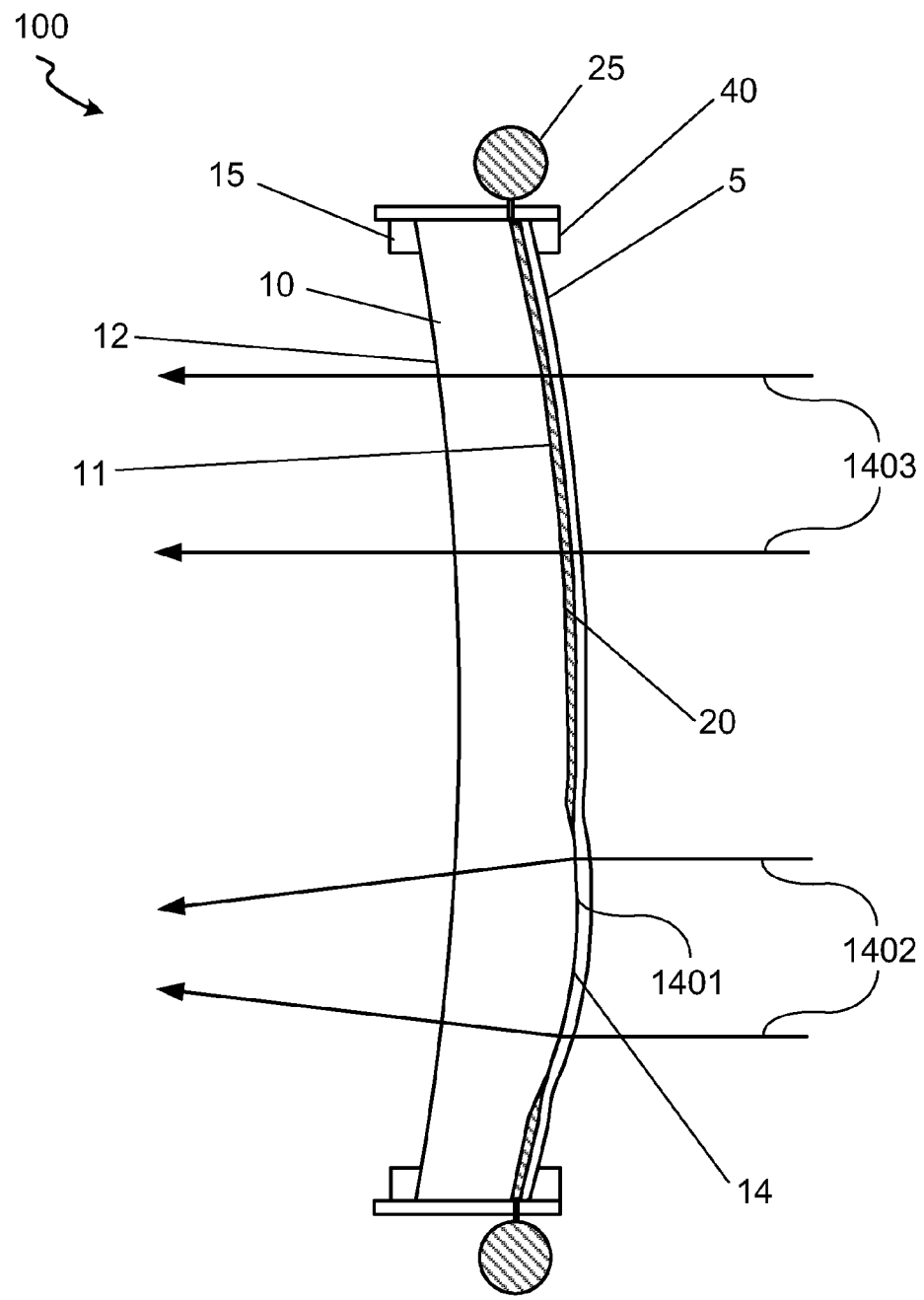
FIG. 14 shows a side view of an exemplary embodiment of a dynamic lens.

In some embodiments, in the first apparatus described above, the flexible element further comprises a second region. The first region of the flexible element of the second lens component may conform to the first surface of the first lens component when the fluid between the first region of the flexible element and the first surface is sufficiently low, while at the same time the second region of the flexible element does not conform to the first surface of the first lens component while the fluid between the second region and the first surface is sufficiently great. That is, the apparatus and the first surface may be such that as the fluid is removed or displaced from between the first and second lens components, different portions of the first surface may no longer be covered by the fluid and thereby a region or regions of the flexible element may adhere and/or conform to those surfaces. At the same time there may be other regions of the flexible element and portions of the first surface where the fluid remains sufficiently great such that these regions of the flexible element do not conform to those portions of the optical surface. This may provide embodiments of the dynamic lens with different optical powers in different regions, and may provide the ability for the user to select which power to be applied at anyone time (or simultaneously). An example of such an embodiment is shown in FIGS. 13 and 14, which will be described in detail below.

In some embodiments, the first apparatus includes a reservoir that may contain the fluid that is not located between the first and the second lens components. The reservoir may comprise any material and may be located within other components of the first apparatus. For instance, for embodiments whereby the first apparatus comprises spectacles, the reservoir may be located in the frames, in the nose bridge, etc. The reservoir may be located in any suitable location, so long as the fluid may enter and be released from the reservoir. Moreover, the apparatus may comprise multiple reservoirs.

In some embodiments, the fluid may be applied between the first and second lens components by an actuator. The actuator may comprise any type of device for applying and/or displacing or removing fluid including, for instance, a syringe, plunger, pump that is mechanically (e.g., spring loaded), manually operated, electrically, or electro-mechanically moved or adjusted to move the placement of the fluid. The actuator may be located in any suitable location and is typically in communication with both a reservoir and the gap between the first and second lens component (and/or a channel to either).

In some embodiments, in the first apparatus described above the first surface further comprises a first optical feature. An optical feature may be anything that alters the optical power of the dynamic lens, including by way of example, any one of, or some combination of, the following: a progressive optical power region; a bifocal; a trifocal; a multi-focal region; an aspherical optical feature; an aspheric region; a rotationally symmetric optical feature; and a non-rotationally symmetric optical feature. By including the optical feature on the first surface of the first lens component, it permits embodiments of the dynamic lens to have a predetermined optical stop having an optical power in that region that can be readily returned to and applied. Moreover, the first surface may have multiple optical features located on different regions. Preferably, in some embodiments a first region of the flexible element of the first apparatus conforms to the first optical feature when an amount of fluid between the first optical feature and the first region of the flexible element is sufficiently low. In such embodiments, the first surface thereby serves as the optical power stop when the fluid is sufficiently removed from between the first lens component and the first region of the flexible membrane.

Moreover, in some embodiments it is preferred that the first region of the flexible element of the first apparatus does not conform to the first optical feature when an amount of fluid between the first optical feature and the first region of the flexible element is sufficiently great. This may be preferred for the same reasons described above, in that this provides the dynamic properties that allow the optical feature to no longer define or contribute to the optical power of a region when the fluid is added and is sufficiently great. Thus, in embodiments, the lens provides multiple optical powers for the same region of the lens depending on the fluid between the flexible element and the first lens component.

In some embodiments, the first apparatus as described above further includes a first dynamic optical power region. The dynamic optical power region refers to a portion of the lens that has an optical power that may be varied. For instance, in some embodiments, the dynamic optical power regions coincides with an optical feature on the first surface of the first lens component. As the amount of fluid that covers the first lens surface that is in optical communication with the dynamic optical region is varied, the optical power of the dynamic optical power region may also be varied. In some embodiments, when the fluid between the first region of the flexible element and the first lens component is sufficiently low, the dynamic optical power region may be defined by the first surface of the first lens component.

In some embodiments where the first surface of the first lens component includes an optical feature and the first apparatus includes a first dynamic optical power region, the fluid may have an index of refraction that is substantially similar to the index of refraction of the first lens component. In such embodiments, it is preferable that the index of refraction of the fluid is such that the first optical feature does not contribute to the first dynamic optical power region when an amount of the fluid between the first optical feature and the first region of the flexible element is sufficiently great. This may enable the optical features on the first surface of the lens component to contribute or define the optical power when the fluid is sufficiently low between the first surface and the first region of the flexible element, while the same feature does not contribute to the optical properties of the same region when the fluid is increased to a sufficiently great level. This may be due, in part, to the fact that the fluid and the first lens component have substantially the same index of refraction, and thereby any optical features may essentially be masked or hidden by the additional fluid in that region.

In some embodiments, the first surface of the first lens component of the first apparatus as described above defines a first optical power stop, which may be for a near vision optical power. That is, the first surface can be such that it provides correction for a viewer corresponding to objects that are close to (i.e. a short distance away from) the viewer. Further, in some embodiments the first surface may be an optical power stop, in that when the fluid between the first region of the flexible membrane and the first surface of the first lens component is sufficiently low, the first surface may define or contribute to the optical power of the lens and also no additional positive power may be added to that region. In some embodiments where the first lens component comprises a first optical feature, the first dynamic optical power region is defined by the first optical feature when the fluid between the first optical feature and the first region of the flexible element is sufficiently low. That is, the optical power stop for that region of the apparatus may be defined by the optical feature on the first surface of the first lens component.

In some embodiments, where the first apparatus described above includes a first dynamic optical power region, the first dynamic optical power region may be tunable. The term "tunable" as used herein means that the optical power may be varied (perhaps continuously) from one value to another. In some embodiments, when an amount of fluid between the first optical feature and the first region of the flexible element is sufficiently low; the dynamic optical power region is defined by the first optical power stop. As the amount of fluid between the first optical feature and the first region of the flexible element is increased, the dynamic optical power region tunes away from the first optical power stop. This may be because the shape of the first region of the flexible element may continue to change and conform to different aspects of an optical feature of the first surface. This may thereby change the optical power of the region of the lens in a continuous way from a first optical power to the optical power stop defined by the first surface when the amount of fluid is sufficiently low.

In some embodiments, where the first apparatus described above includes a first dynamic optical power region, a decrease in the volume of fluid between the first lens component and the first region of the flexible element of the second lens component may increase a positive optical power of the dynamic optical power region. This may again be caused, in part, by the shape of the first surface that comprises an optical feature or curvature that adds positive optical power, and therefore the reduction of fluid (which may be index matching to the first lens component) exposes these features, which may then contribute (i.e. add positive optical power) to the optical power of the region. In some embodiments, a decrease in the volume of fluid between the first lens component and the first region of the flexible element of the second lens component decreases a positive optical power of the dynamic optical power region. For the same reason, the first surface of the first lens component may provide a negative optical power, which contributes to the optical power of a region of the lens when the index matching fluid is removed or displaced.

In some embodiments, in the first apparatus as described above, the shape of the second lens component is adjustable based on the amount of fluid between the first lens component and the second lens component. As noted above, the second lens component may comprise a flexible element, which may be a membrane. The flexible element may change shape based on the amount of fluid and/or the pressure applied to the flexible element. Moreover, as described above, the first region of the flexible element may conform to at least a portion of the first surface of the first lens component.

In some embodiments, in the first apparatus as described above, the first lens component has a first index of refraction, the second lens component has a second index of refraction, and the fluid has a third index of refraction. In some embodiments, the first index of refraction is substantially the same as the second index of refraction. That is, the first lens component and the fluid may be indexed matched such that light that propagates between the two components is not substantially refracted. This may permit the optical features of the first surface to be masked or hidden (i.e. they do not contribute to the optical power) when there is a sufficiently great amount of fluid covering the surface. In some embodiments, the first index of refraction is substantially the same as the third index of refraction. That is, the first lens component and the second lens component (and/or the flexible component of the second lens component) may be indexed matched. This may prevent any light entering the lens from being refracted at the interface between the flexible element and the first lens surface, which may thereby affect the optical power of that region of the apparatus. In some embodiments, the first, the second, and the third index of refraction are substantially the same. This may be preferred so that an optical feature on the first surface may correspond to a correction optical power needed by a wearer, and there will not be any additional optical power caused by the interface of any of these components that would have to be accounted for in the design of the apparatus. This may result in an apparatus that may be more easily designed to provide no optical power in some embodiments (e.g. when the first surface or a portion thereof is covered by the fluid), which may desirable is a viewer does not need correction of object at certain distances, because there is no need to correct for the refraction at the interfaces of the components.

In some embodiments, the first apparatus as described above includes a third lens component having a first surface and a second surface. The third lens component can be a cover lens, which may serve to protect the flexible membrane. Preferably, the first lens component and the third lens component are positioned such that a gap exists between the first surface of the first lens component and a first surface of the third lens component. In some embodiments, the second lens component may be located substantially within this gap between the first and third lens components. Preferably, at least a portion of the second lens component conforms to at least a portion of the first surface of the third lens component when an amount of fluid substantially fills the gap between at least a portion of the first lens component and at least a portion of the third lens component. That is, the third lens component defines the maximum position that the flexible element may expand to when fluid is applied between the first lens component and the flexible element. In some embodiments, the first surface of the third lens component defines a second optical power stop. In some embodiments, the second optical stop power stop is for a distance vision optical power. That is, the third lens component may have an optical feature such that, when a region of the flexible element conforms to the surface, a dynamic optical region provides the needed optical power for correction of a wearer's distance vision. This provides the advantage that a dynamic lens may correct both near vision and distance vision. Moreover, by providing an optical power stop for each (defined by a fixed or rigid lens component), the apparatus provides a reliable way to consistently and precisely return to the desired optical power.

Exemplary Embodiment

An exemplary embodiment will be described with reference to FIG. 1, which illustrates a side view of a lens 100. This is meant for descriptive purposes only, and is thereby not limiting.

The lens 100 can comprise a first lens component 10 and a second lens component 5. The second lens component 5 can be positioned closer to an object being observed or viewed with the lens 100 (such that, for example, the first lens component 10 is positioned closer to a user of the lens 100). A fluid (or liquid or gel, etc.) 20 can be positioned between the first lens component 10 and the second lens component 5. The first lens component 10 can be a solid lens comprising a material having a homogeneous index of refraction. In some embodiments, the fluid 20 can have an index of refraction that is approximately equal or substantially the same to the index of refraction of the first lens component 10.

The first lens component 10 can comprise a first surface 11 (the surface of the first lens component 10 that is adjacent to the fluid 20) and a second surface 12 (the surface of the first lens component 10 that is not adjacent to the fluid 20). The first 11 and second 12 surfaces of the first lens component 10 can each have any shape or curvature (including concave, convex, and/or a flat curvature (e.g. radius that is approximately equal to infinity)). Further, any optical feature—for example, a progressive optical power region, a bifocal, trifocal or other multifocal region, an aspheric optical feature, an aspheric region, a rotationally symmetric optical feature (including rotationally symmetric aspheric regions), a non-rotationally symmetric optical feature (including non-rotationally symmetric aspheric regions), or any combination thereof—can be positioned on any portion of either the first surface 11 or the second surface 12 of the first lens component 10.

The second lens component 5 can comprise a flexible element such as a flexible membrane. The second lens component 5 can also be stretchable. Accordingly, the shape of the second lens component 5 can be dynamically adjusted based on the volume of fluid 20 positioned between the first lens component 10 and the second lens component 5. Specifically, as the amount or volume of fluid 20 is decreased, the second lens element 5 (or a portion thereof) can be drawn toward the first surface 11 of the first lens component 10. Eventually, a region of the second lens component 5 can come into contact with and/or conform to the shape of the first lens component 10. Correspondingly, as the amount or volume of fluid is increased, the second lens component 5 can be moved away from the first surface 11 of the first lens component 10. The flexible element (or regions thereof) of the second lens component 5 can be a material such as, but not limited to, biaxially oriented polyethelene terephthalate (available under the trade name Mylar) or urethane, and may in some embodiments be translucent or transparent.

As the shape of the second lens component 5 is dynamically adjusted, the optical power in one or more regions of the lens 100 can be varied or adjusted. When the fluid 20 (in this embodiment, the fluid is index matched to the first component) separates the first lens component 10 and the second lens component 5, any optical feature on a portion of the first surface 11 of the first lens component 10 covered by the fluid 20 will not contribute to the optical power provided by the lens 100. As noted above, this is because the fluid 20 has an index of refraction that approximately matches the index of refraction of the first lens component 10. When the amount of fluid 20 that separates the first lens component 10 and the second lens component 5 is substantially low, then the second lens component 5 (or a region thereof) can conform to the shape of the first surface 11 of the first lens component 10. In turn, any optical feature on a portion of the first surface 11 of the first lens component 10 can contribute to a dynamic optical power provided in various portions of the lens 100. More specifically, any optical feature on the first surface 11 of the first lens component 10 that can be covered and not covered by the fluid 20, can contribute to a dynamic optical power provided by lens 100. As noted above, such a region can be considered to be a dynamic optical power region of lens 100. A dynamic optical power region of the lens 100 can be of any shape or size and can contribute any desired optical power when no longer covered by the fluid 20. Further, a dynamic optical power region of the lens 100 can be placed into optical communication with one or more additional optical features of the lens 100 (e.g., an optical feature positioned on the second surface 12 of the first lens component 10). In this way, a dynamic optical power region of the lens 100 can contribute a portion of a total desired optical power for a region of the lens 100 (e.g., a first portion of a total add power of the lens 100).

The fluid 20 can be moved by any suitable method and mechanisms. As an example, movement of the first lens component 10 can displace the fluid 20. If the first lens component 10 is moved towards the second lens component 5, the fluid 20 can be forced out of the region separating the first lens component 10 and the second lens component 5. If the first lens component 10 is moved away from the second lens component 5, the fluid 20 can be allowed or forced to enter the region separating the first lens component 10 and the second lens component 5. In some embodiments, an actuator can pump the fluid into and out of a region between the first lens component 10 and the second lens component 5. Such an actuator may for example, in embodiments comprising spectacles, be positioned within a temple of a lens frame housing the lens 100. However, the actuator may be located in any suitable location.

The fluid 20 can be evacuated (i.e. removed or displaced) to a chamber or reservoir, which may be positioned in a variety of places with respect to the lens 100. As an example, and as shown in FIG. 1, the fluid 20 can be evacuated to one or more reservoirs 25. As an additional example, the fluid can be pumped into a reservoir positioned within a temple of a lens frame housing the lens 100.

As noted above, the exemplary lens 100 depicted in FIG. 1 is illustrative only, and is not meant to be limiting. As shown in FIG. 1, the fluid 20 is depicted as separating the entire first surface 11 of the first lens component 10 from the entire second lens component 5 comprising a flexible element (i.e., as depicted, the fluid can cover approximately the entire first surface 11 of the first lens component 10), but embodiments are not so limited. That is, in some embodiments the fluid 20 of a dynamic lens 100 can be positioned between only select portions of the first lens component 10 and the second lens component 5. For portions of the lens 100 where the amount of fluid 20 that separates the first lens component 10 and the second lens component 5 is permitted to be substantially low, the region of the flexible element 5 can approximately conform to that portion of the first surface 11 of the first lens component 10. Further, in some embodiments, portions of the flexible element 5 can be adhesively attached to the first surface 11 of the first lens component 10. Additionally, some embodiments can comprise a flexible element 5 and a lens component 10 that are in alternate positions to that illustrated in FIG. 1. That is, the flexible element 5 is positioned closer to a user of the lens 100 and the first lens component 10 is positioned further form the user. In such embodiments, optical features positioned on the second surface 12 of the lens component 10 would be exposed or covered based on the presence or absence of fluid 20 separating regions of the flexible membrane 5 from the lens component 10.

Embodiments provide a dynamic lens that can dynamically adjust the overall optical power provided by one or more optical regions of the dynamic lens by exposing or covering optical features of a surface of a lens component with an approximately index matched fluid. Embodiments may be used to form any variable optical power lens; with the optical power of the lens capable of being varied spatially and/or temporally.

DESCRIPTION OF FIGURES

The figures will now be described in more detail. The figures are provided as examples of embodiments and/or operation of a dynamic lens. The figures, and the descriptions herein, are for illustration purposes and are not intended to be limiting.

Figure 2:
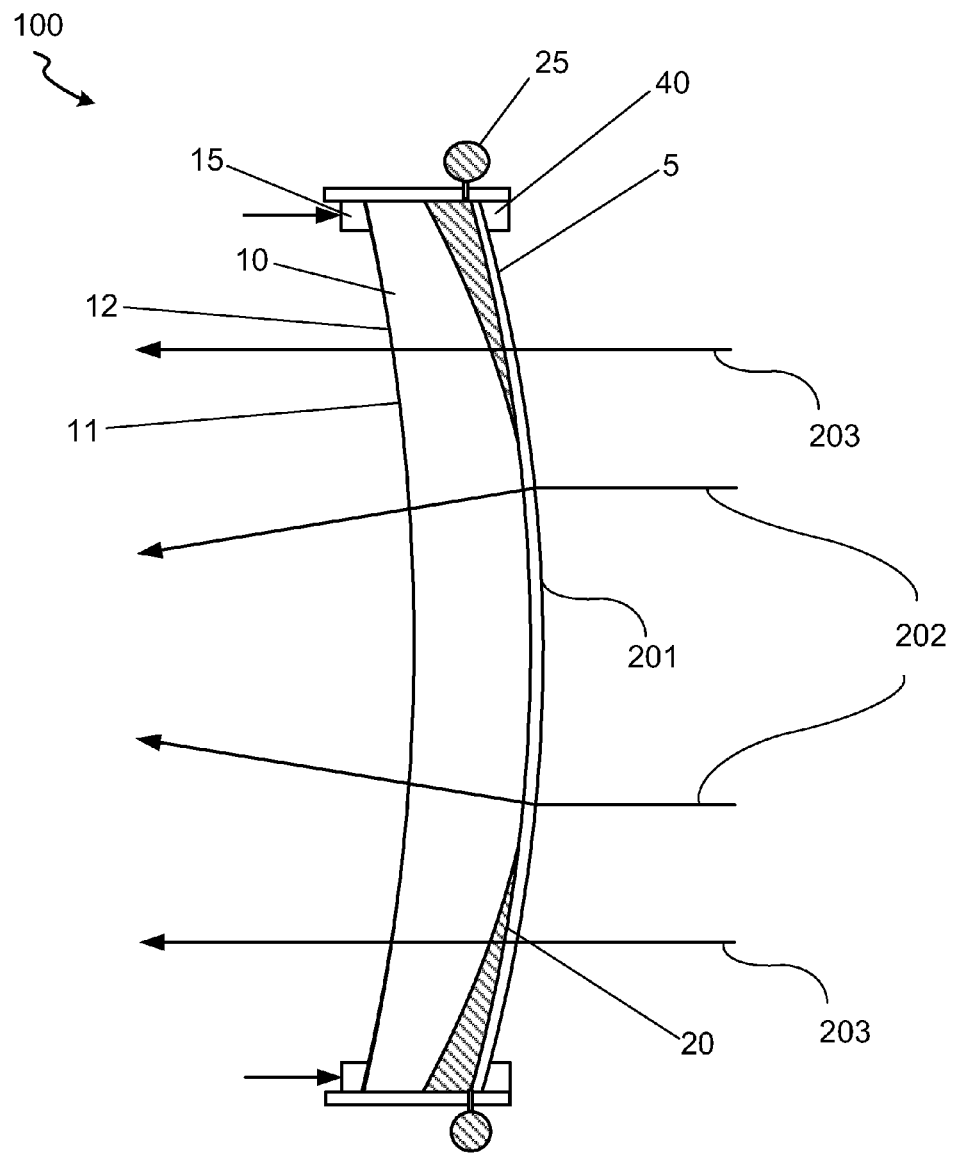
FIG. 2 shows a side view of an exemplary embodiment of a dynamic lens.
Figure 3:
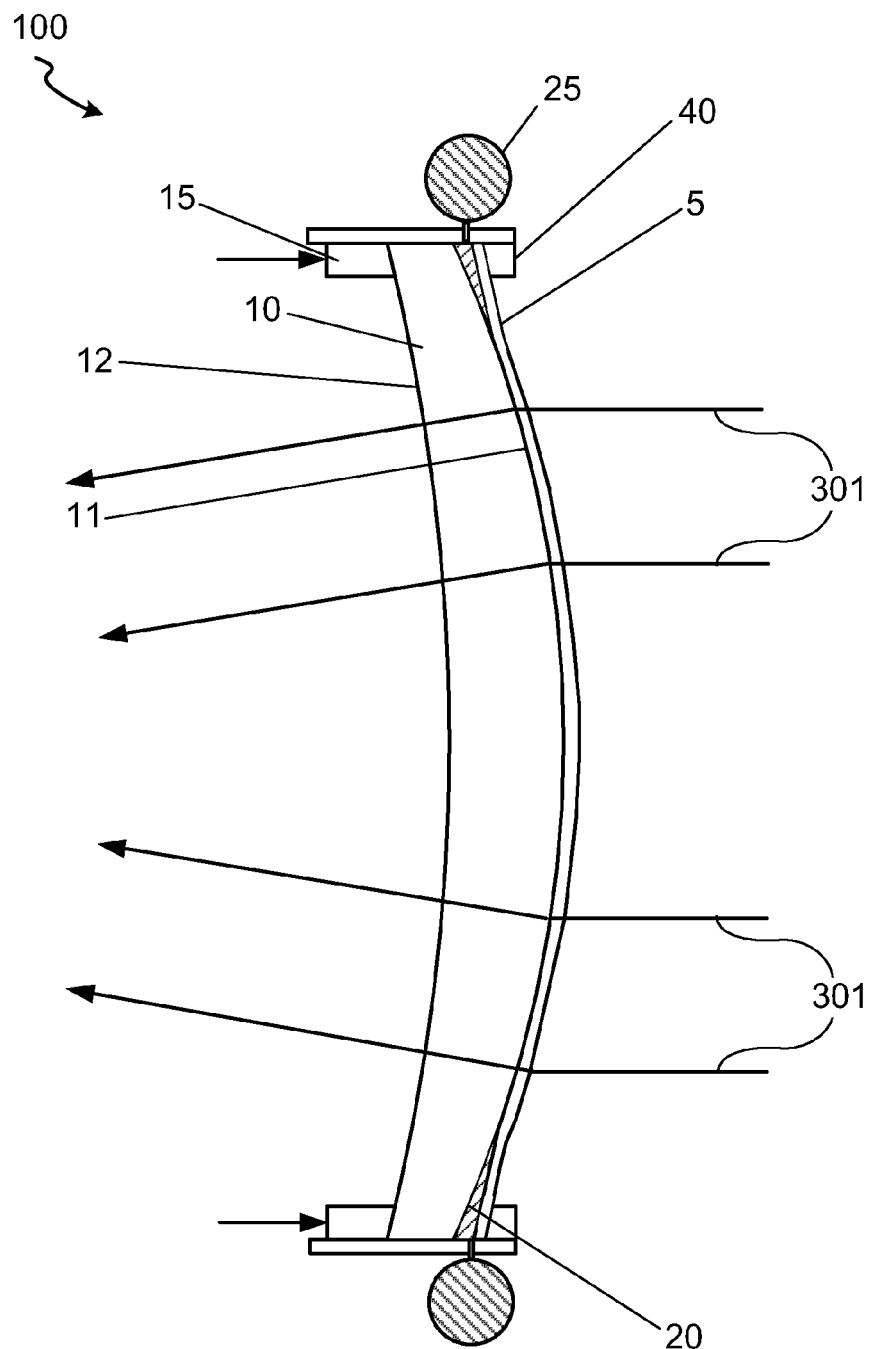
FIG. 3 shows a side view of an exemplary embodiment of a dynamic lens.

FIGS. 1-3 show the operation of an exemplary embodiment of a dynamic lens. Exemplary lens 100 is shown in FIG. 1 as having a sufficiently great amount of fluid 20 between the flexible element 5 and the first surface 11 of the first lens component 10 such that the flexible element 5 does not conform to the first surface 11. In FIG. 2, lens 100 is shown as having only a portion of the flexible element 5 and the first surface 11 having a sufficiently great amount of fluid between them. In FIG. 3, lens 100 is shown as having a sufficiently low amount of fluid 20 between most of the flexible element 5 and the first surface 11 of the first lens element 10. Each of these exemplary embodiments will be described in more detail as follows.

With reference to FIG. 1, a cross-section of an exemplary embodiment of a dynamic lens is shown. The lens 100 is depicted in an approximately "first" or "beginning" state. In this embodiment, the fluid 20 separates the entire first surface 11 of a first lens component 10 from a second lens component comprising a flexible element 5 (e.g. a flexible membrane). However, as described above, in some embodiments the fluid may separate only a portion of the first lens component 10 and the flexible element 5 of the second lens component. In this exemplary embodiment, the fluid 20 and the flexible element 5 may have an index of refraction that substantially match that of the first lens component 10. As noted above, "substantially match" means that there is not an appreciable difference in the indexes of refraction of the two components, for instance, the indexes of refractions are within 0.05 units. Although this exemplary embodiment will be described with reference to the situation where the indexes are substantially the same, it should be understood that in some embodiments, the index of refraction of one or more of these components may be different from the others, which will be discussed in detail below.

In this first state as depicted in FIG. 1 (and continuing with the embodiment where the index of refraction of the fluid and the first lens components are substantially the same), the optical features of the first surface 11 of the first lens component 10 may not contribute to the optical power provided by the lens 100. This is because the amount of the fluid 20 that is between the first surface 11 (and any optical feature thereon) and the flexible membrane 5 is sufficiently great so as to cover the features. As depicted in FIG. 1, the lens 100 is illustrated to be a single vision lens (e.g., plano) in the first state. That is, the curvature of the flexible element 5 is approximately the same as the curvature of surface 12, such that the lens 100 does not have an optical power. Thus, light rays 101, which are parallel at the point of incidence with the lens, emerge from the lens substantially parallel. However, it should be understood that in other embodiments the lens 100 (or regions thereof) may have different optical powers and/or optical properties in this first state. For example, the second surface 12 (e.g. the back surface) of the first lens component 10 could comprise any optical feature (e.g. a multifocal region such as a progressive optical power region) such that the lens 100 provides one or more optical powers in the first state. As depicted, this first state in FIG. 1 illustrates an embodiment where the surface 11 does not contribute to the optical power.

With reference to FIG. 2, the exemplary lens 100 is depicted to be in a "second" or "transitional" state. Specifically, a portion of the fluid 20 has been removed or displaced from the gap between the first lens component 10 and the second lens component 5. As depicted, a first region 201 of the flexible element 5 of the second lens component begins to change shape as the fluid 20 is removed or displaced. As the first region 201 of the flexible element 5 comes into contact with and/or conforms to the first surface 11 of the first lens component 10, it conforms to its shape or curvature.

In this embodiment, the optical power provided by the lens 100 in a particular region can be adjusted or changed based on the shape of the corresponding portion of the first surface 11 of the first lens component 10 as the fluid 20 is removed or displaced. This is depicted in FIG. 2 by the refraction of the light rays 202 that are incident to the lens 100 in the region where the first region of the flexible element 5 has conformed to the first surface 11 of the first lens component 10. In contrast, light rays 203 are not shown as being refracted by the lens 100 as, in this exemplary embodiment, the curvature of the second region of the flexible element 5 continues to match the curvature of the surface 12 (that is, the lens in this portion continues to be plano). It should be understood that as fluid is displace or removed, the optical power of this portion of the lens 100 can also vary (that is, it may continually and/or gradually change) until the optical power for this region of the lens is equal to the optical power provided by the first surface 11 of the first lens component 10.

In some embodiments, the fluid 20 can be displaced by using movable slide 15 and fixed portion 40. That is, the fluid 20 may be removed by moving the slide 15 of the apparatus away from a fixed portion 40 to permit fluid to be applied to or removed from the gap between the first lens component 10 and second lens component. Any fluid that is not in the gap between the first 10 and second lens component 5 may be stored or retained in a reservoir 25 or other suitable area of the lens 100 and/or apparatus. However, as would be understood by one of ordinary skill in the art, any means may be used to remove, displace, and/or apply the fluid to the gap, including using an actuator, a pump, a valve system, etc.

Although not depicted in FIG. 2, it should be understood that as the fluid 20 is applied (e.g. added) or removed (or otherwise displaced) from the gap between the first lens component and the second lens component 5 (or portions thereof), and the flexible element 5 begins to change shape (while not necessarily conforming to the surface) the optical power of that region may also begin to change. This may result in a tunable optical power for the region of the lens, with an optical stop that results when the fluid between the first surface 11 and a region of the flexible element 5 is sufficiently low that the optical power of that region of the lens is defined by the first surface 11 and any optical feature thereon.

With reference to FIG. 3, the exemplary lens 100 is depicted in an approximately "final" or "second" state. Although described as a "second" state, as noted above, there are potentially an infinite number of states of the exemplary lens 100 because the optical power of the lens 100 (or a region thereof) may continue to change as fluid 20 is removed from (or applied to) the gap between the first lens component 10 and flexible element 5. As noted above, this processes may be referred to as "tuning," in that the optical power may be gradually or systematically changed to a power that approaches an optical power stop, or moves further away from an optical power stop.

Continuing with FIG. 3, as depicted the fluid 20 has been approximately displaced or removed from between the first lens component 10 and the flexible element 5 of the second lens component. Additional regions of the flexible element 5 of the second lens component have changed shape as they came into contact with and/or conformed to the first surface 11 of the first lens component 10. As shown in FIG. 3, an optical power provided by the lens 100 has been adjusted by having the flexible membrane 5 conform to the shape of the first surface 11 of the first lens component 10. Thus, light rays 301 are now refracted and focused based on the optical power of lens 100 and, in particular, as defined by the first surface 11 of the first lens component 10.

As shown in FIG. 3, the lens 100 is depicted as being a single vision lens (e.g., providing positive optical power), but embodiments are not so limited. That is, a portion of the first surface 11 of the first lens component 10 can comprise a multifocal region—for example, a progressive optical power region—such that the lens 100 in the "second state" provides multiple optical powers or vision zones. For instance, the first surface 11 may comprise any desired optical feature (or multiple optical features). As noted above, second surface 12 may also have an optical feature or optical features, which contribute to the overall optical power for lens 100 (or a region thereof).

Figure 4:
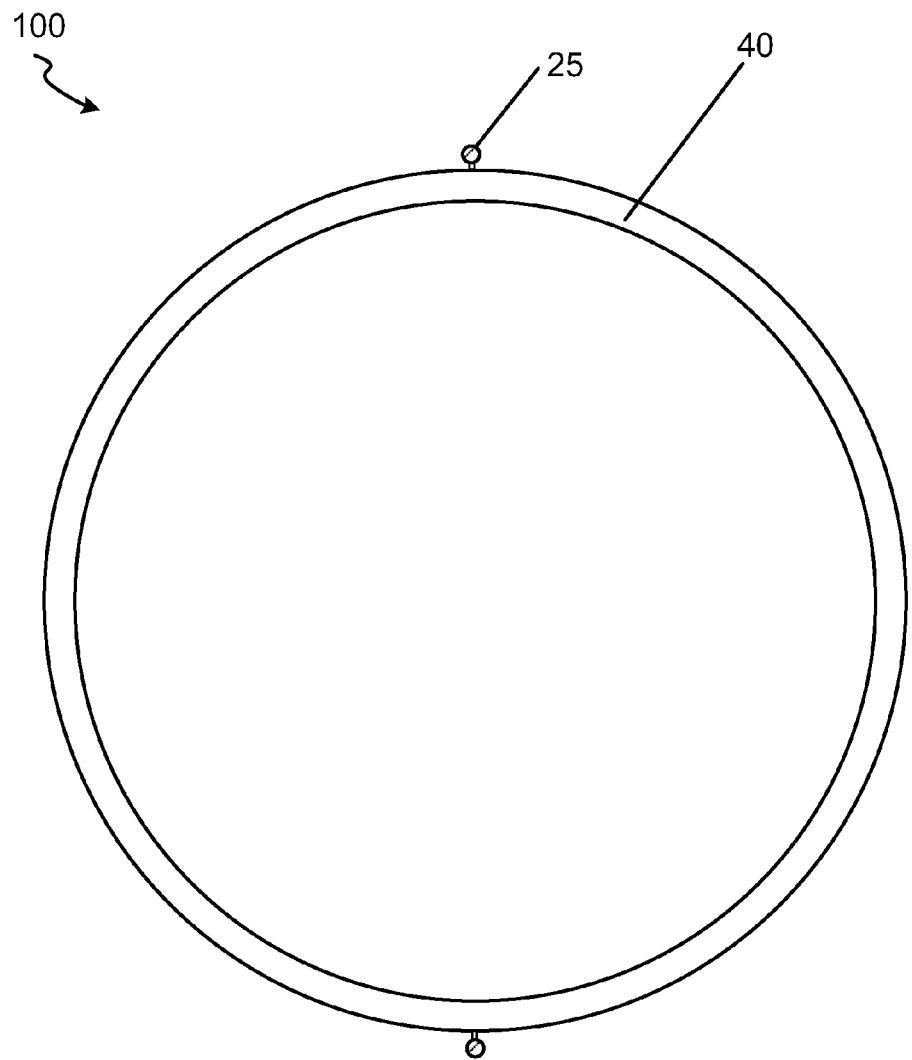
FIG. 4 shows a side view of an exemplary embodiment of a dynamic lens.

With reference to FIG. 4, the exemplary lens 100 is shown in a front view. As depicted, the lens 100 in FIG. 4 corresponds to the lens in the "first" or "initial" state as was described with reference to FIG. 1. That is, the lens 100 is depicted in a state whereby the amount of fluid 20 in the gap between the first surface 11 of the first lens component 10 and the flexible element 5 is sufficiently great such that the first surface (or a portion thereof) does not contribute to an optical power region of the exemplary lens 100 when the fluid is index matched. Also depicted in FIG. 4 are a fluid reservoirs 25 and a solid component 40 located around the periphery of the lens components.

Figure 5:
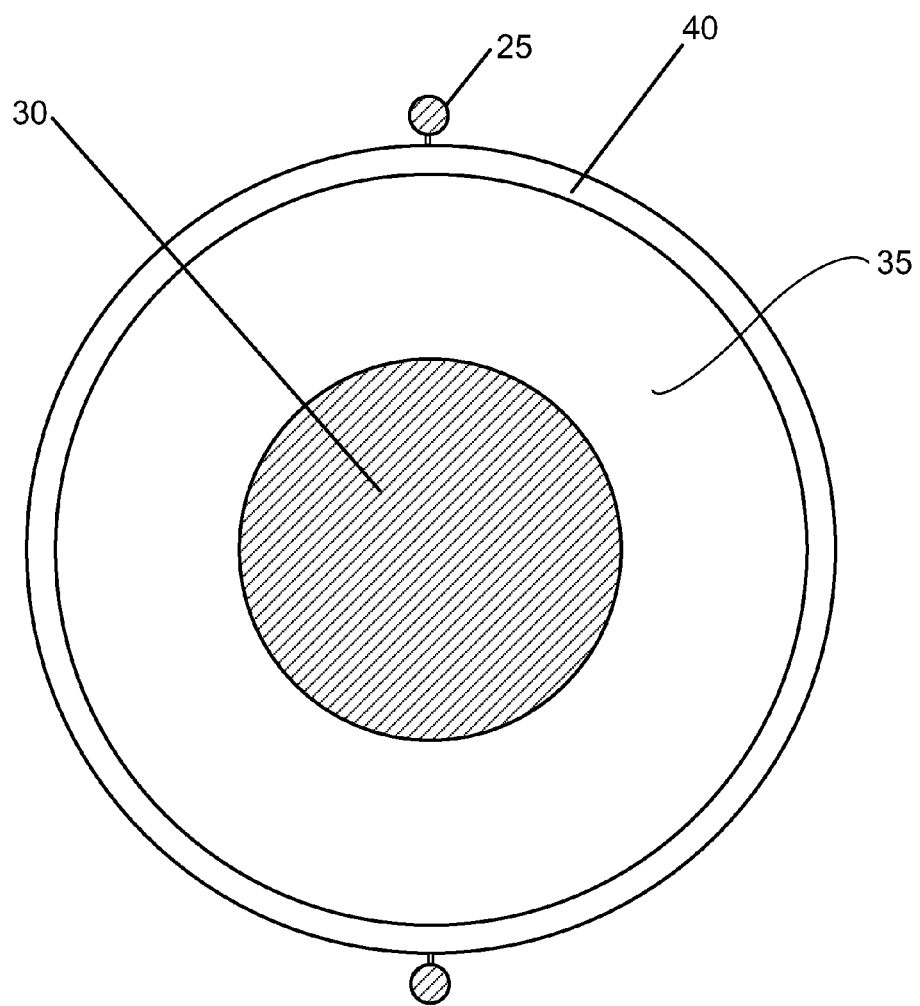
FIG. 5 show a front view of an exemplary embodiment of a dynamic lens.

With reference to FIG. 5, the exemplary lens 100 is shown in a front view. As, depicted, the lens 100 in FIG. 5 corresponds to the lens in the "transitional" state as was described with reference to FIG. 2. In this embodiment, a region or zone 30 is shown that is distinguished from an outer periphery 35 of the lens 100. The region 30 may correspond to the first region of the flexible element 5 that has come into contact with and/or has conformed to the first surface 11 of the first lens component 10. That is, the amount of fluid 20 between the first region of the flexible element 5 and the first surface 11 is sufficiently low in region 30 such that the first surface 11 contributes to and/or defines the optical power of lens 100 in that optical region. As such, the region 30 can provide an optical power that varies from the optical power provided by the area 35 of the lens surrounding the region 30. The region 30 can be considered to be a portion of a dynamic (or adjustable) optical power region of the lens 100 because as the amount of fluid between the first surface 11 and the flexible element 5 is varied, the optical power of that region may be tuned toward, or away from, the optical power stop defined by the first surface 11.

Figure 6:
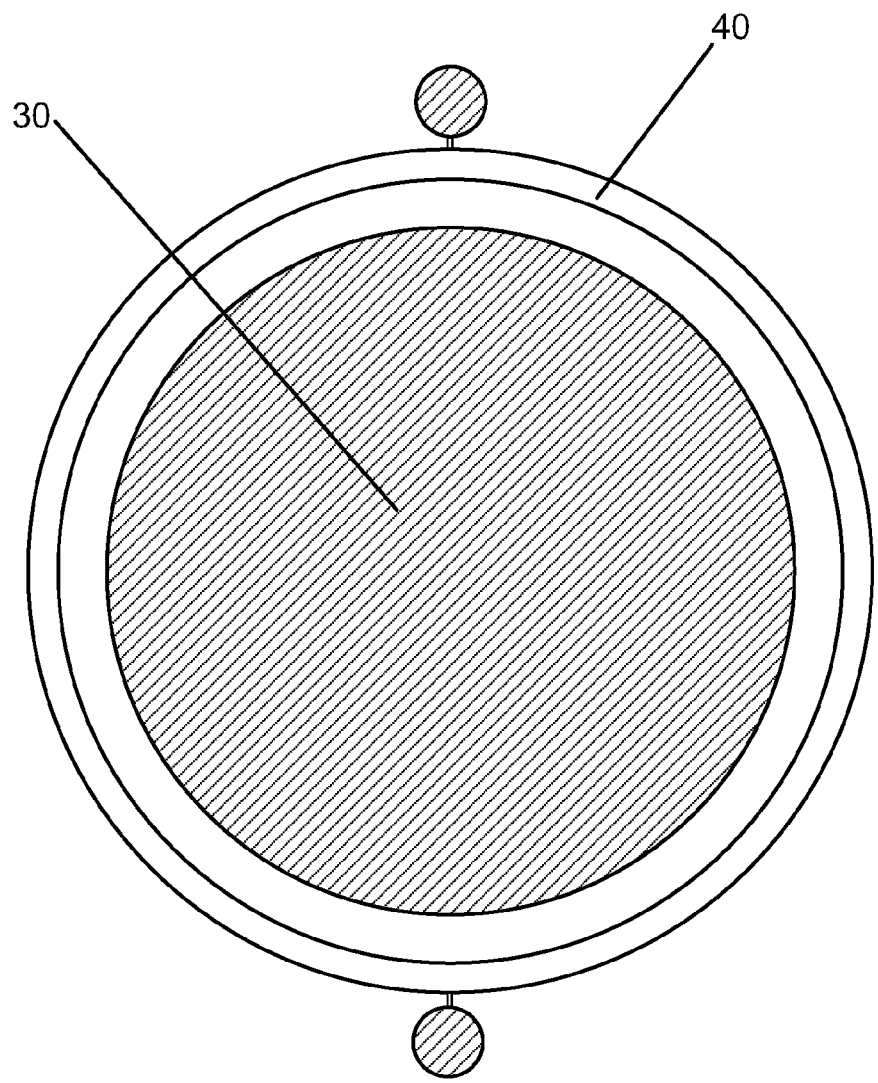
FIG. 6 show a front view of an exemplary embodiment of a dynamic lens.

With reference to FIG. 6, the exemplary lens 100 is shown in a front view. As depicted, the exemplary lens 100 in FIG. 6 corresponds to the lens in the "second" or "final" state as was described with reference to FIG. 3. The region 30 is enlarged compared to the region 30 depicted in FIG. 5 because, as was described with reference to FIG. 3, this illustrates a stage in which substantially all of the fluid has been removed or displaced from between the flexible element 5 and the first surface 11. The region 30 may again correspond to the first region of the flexible element 5 that has come into contact with and/or has conformed to the first surface 11 of the first lens component 10. That is, the amount of fluid 20 between the first region of the flexible element 5 and the first surface 11 is sufficiently low in region 30 such that the first surface 11 contributes to and/or defines the optical power of lens 100 in that region. Thus, as depicted in FIG. 6, a greater portion of the first surface 11 of lens 100 is contributing to a dynamic optical power region than in FIG. 5.

In general, the region 30 can be of any size or shape and can provide a constant optical power or a variable optical power (having either a symmetric or non-symmetric and either a continuous or discontinuous optical power profile). The region 30 can be positioned to be centered or located in any region of the lens 100. Further, the lens can include more than one adjustable optical power region 30, which may be physically separated and/or comprise multiple flexible elements. Moreover, the region 30 can comprise any type of optical feature, including, but not limited to: a progressive optical power region, a bifocal, a trifocal, a multi-focal region, an aspherical optical feature, an aspheric region, a rotationally symmetric, optical feature; and/or a non-rotationally symmetric optical feature.

One skilled in the pertinent art will appreciate and understand that, in general, embodiments of a dynamic lens as provided herein may provide a first or initial optical power profile for a region in a "first" or "initial" state, can provide transitional optical power profiles in "transitional" states (e.g. can be tuned from a first state to intermediate states, whereby the amount of fluid 20 between portions of the first surface 11 of the first lens component 10 and the first region of the flexible element 5 are varied), and can provide a second optical power profile for a region in a "second" or "final" state based on the exposure (e.g. when a sufficiently low amount of fluid 20 is between the first surface 11 and the first region of the flexible element 5) of optical features on the first surface 11 of the first lens component 10. The "first", the "transitional", and the "second" optical power profiles can be any desired optical power profiles. One or more surfaces or optical features can contribute to the optical power profiles provided by the lens 100 (e.g., two or more surfaces can provide a total add power of the lens 100 by being in optical communication with one another). Further, one skilled in the pertinent art will appreciate the different methods and mechanism that can be used to displace and store the fluid used in the dynamic lens of the present invention, which may include, for example, an actuator and/or reservoir.

In some embodiments, the first optical power profile and/or an optical region described with reference to FIGS. 1 and 4 can be determined, in part, by the second surface 12 of the first lens component 10 and the flexible membrane 5. As described above, the first optical power profile can be provided by the lens 100 when the fluid 20 covers one or more optical features of the first surface 11 of the first lens component 10. That is, the first optical profile may comprise an embodiment in which there is a sufficiently great amount of fluid 20 between the first surface 11 and the flexible element 5.

In some embodiments, the "second" optical power profiles as described with reference to FIGS. 3 and 6 can be determined, in part, by the second surface 12 of the first lens component 10 and the first surface 11 of the first lens component 10. The second optical power profile can be provided by the lens 100 when the one or more previously covered optical features of the first surface 11 of the first lens component 10 are exposed as described above. That is, the second optical profile may comprise the situation in which there is a sufficiently low amount of fluid 20 between at least a portion of the first surface 11 and the flexible element 5, such that a first region of the flexible element 5 conforms to the first surface 11. Furthermore, in some embodiments, there may be intermediate ("transitional") optical profiles between the first and second optical profiles (described with reference to FIGS. 2 and 5) that may be defined, in-part, by the different amounts of fluid 20 between the first surface 11 and the flexible element 5, which results in a different shape of the flexible element 5 and/or different portions of the first surface 11 (and optical features thereon) contributing to the dynamic optical power regions of the lens 100.

The embodiments described above may provide several advantages. For example, the first surface 11 of some of these embodiments may define a fixed optical power stop for one or more optical regions of the lens 100, which may be accurately and repeatedly returned to by a user. This is due, in part, because the optical power stop of an optical region of the lens 100 is not defined by adding a specific amount of fluid, but may be defined, similar to current fixed (i.e. non-dynamic) lenses using an optical surface 11 that does not change. Embodiments may thereby allow for a user to quickly set the lens to the desired optical power by, for example, removing or displacing all (or substantially all) of the fluid from between the first surface 11 (or a part thereof) and a first region of the flexible element 5. Thus, if a user has a specific prescription, embodiments may readily enable a user to set the lens 100 to provide the needed optical correction. Embodiments may also provide the further benefit that this fixed optical feature does not always contribute to the optical power of a region of the lens. This may, for example, permit the same optical region in one instance to allow a viewer to see distant objects, and in another instance, the same optical region may correct for nearsightedness. Any type of correction may be provided.

As noted above, the flexible element 5 may comprise a flexible membrane. The flexible element 5 may be adhered or attached to the lens 100 in any location. For instance, portions of the flexible element 5 may be adhered to any one of, or some combination of: portions of the first surface 11, the first optical component 10, a fixed portion of the lens 40, an eye glass frame, or any another appropriate location on lens 100. In some embodiments, the second lens component may have fixed components as well as a flexible element (such as a membrane). In some embodiments, the flexible element 5 may be coated with a hard coat/anti-scratch coating, an anti-reflection coating, and/or an anti-soiling coating. In some embodiments, an apparatus comprising a dynamic lens may not have any additional optical components adjacent to the surface of the flexible element 5 that does not conform to the first surface 11 of the first lens component 10. In some embodiments, the dynamic lens may have additional optical components adjacent to the surface of the flexible element 5 that does not conform to the first surface 11 of the first lens component 10, such as another lens, a dynamic lens, a cover lens, or any other transparent or semi-transparent component.

In some embodiments (and as described above), the fluid 20 may be index matched to some or all of other optical components of the lens 100. That is, the indexes of refraction may be substantially the same. For instance, the fluid 20 can have an index of refraction that is matched to within approximately 0.05 units of the refractive index of the first lens component 10. The flexible element 5 can also be index matched the fluid 20 and the first lens component 10.

In some embodiments, the fluid 20 is not index matched to the first lens component 10. In such embodiments, the lens 100 may still function in the same manner as described above, however, each of the states of the dynamic lens that were described with reference to FIGS. 1-6 may have an optical power, even in regions whereby the first surface 11 is substantially covered by the fluid 20. For instance, in the "first" state when the fluid between the first surface 11 and a first region of the flexible element 5 is substantially great, rather than light rays entering parallel and emerging from the lens 100 parallel, the light rays may be focused based on an optical power of the lens 100 provided, in part, by the difference in index of refraction. However, the first surface 11 may still define an optical power stop, which may be tuned to, or away form, based on the amount of fluid 20 between the flexible element 5 and the first surface 11.

Additional embodiments of exemplary dynamic lenses that may comprise various features will be described below in relation to FIGS. 7-20.

Figure 7:
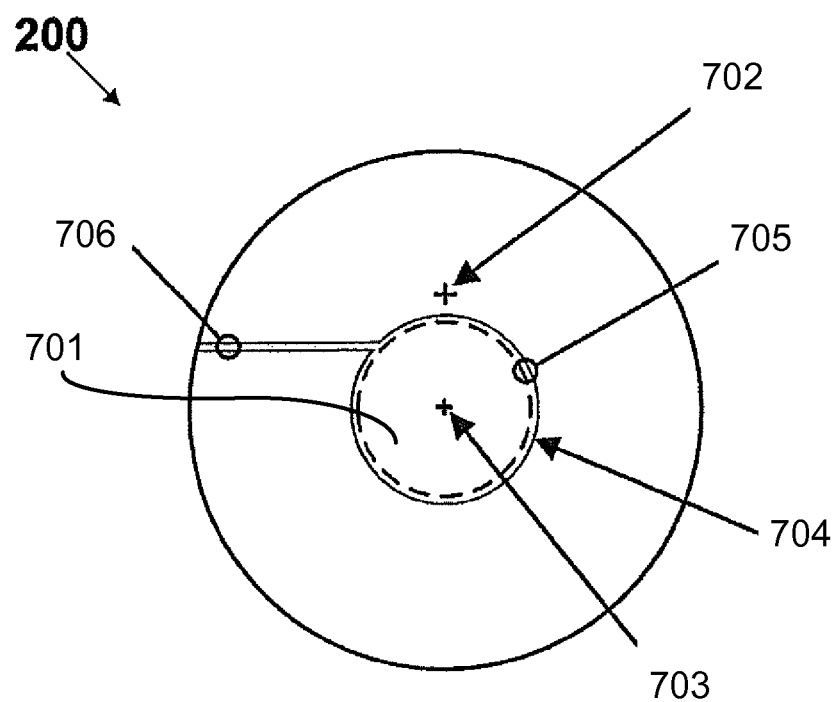
FIG. 7 show a front view of an exemplary embodiment of a dynamic lens.
Figure 11:
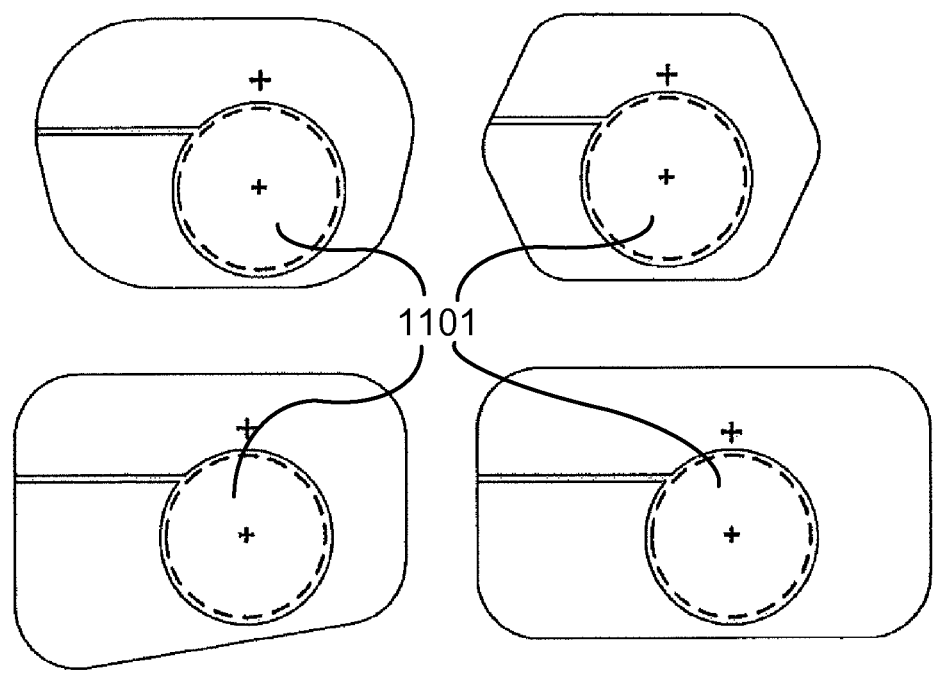
FIG. 11 shows multiple exemplary embodiments of a dynamic lens.

With reference to FIG. 7, an embodiment of a dynamic lens 200 is shown. The lens 200 shown in FIG. 7 can be a lens blank (e.g., an unfinished lens blank or a semi-finished lens blank). The lens shown in FIG. 7 can be edged and finished to fit into a spectacle frame (e.g., as shown in FIG. 11, which will be described further below). Continuing with the description of FIG. 7, the flexible element of the lens 200 is adhered over the entire lens except the circular region 701 shown by the dashed line. In this embodiment, the dynamic or adjustable power region is the area 701 within the dashed line. Accordingly, the area 701 is the region of the lens 200 having an optical power that may change as the fluid of the lens 200 is extracted or displaced from this region. The region 701 can be positioned below a fitting point 702 of the lens, but is not so limited (that is, it may be position anywhere on the lens 200). The region 701 can be centered about the geometric center 703 of the lens, but again is not so limited. Further, a dynamic lens 200 of the present invention can have a fitting point 702 that coincides with the geometric center 703 of the lens, but is not so limited.

Continuing with the exemplary embodiment shown in FIG. 7, a bond line 704 shows the separation between the region of the flexible element that is adhered to the lens 200 (e.g. the first region) and the region 701 of the flexible element that is not adhered to the lens 200. A trench or moat 705 can surround all or a portion of the unattached flexible element portion. In some embodiments, a trench or moat 705 can be located on the first surface of the first lens component. The trench or moat 705 can be used to route or direct the movement of the fluid in lens 200. In some embodiments, the trench or moat 705 may be of a width and depth to cause the flexible element to stretch when the flexible element is pulled or otherwise disposed into the trench or moat 705 as the fluid is removed or displaced from the region 701. The trench or moat 705 can be polished and shaped by mold or other suitable means so as to reduce or eliminate the number of sharp edges. In some embodiments, the trench or moat 705 may be utilized so as to prevent the fluid from reentering the gap between the flexible element and the first surface of the first lens component (e.g. it may be utilized to form a seal of the dynamic region 701). In some embodiments, the diameter of the trench or moat 705 may be within the range of approximately 10 to 50 mm. Preferably, the diameter of the trench or moat 705 is within the range of approximately 20 to 35 mm.

In some embodiments, the fluid can enter and exit the dashed region 701 using a channel 706. The channel is shown in FIG. 7 to extend horizontally from the dynamic power region 701 but is not so limited. That is, the channel 706 can extend from the dynamic power region 701 in any direction or at any angle (e.g., it may be sloped at a slight angle away from the dynamic power region 701). The channel 706 may connect to one or more reservoirs that retain the fluid when it is not applied between the flexible element and the first surface of the first lens component.

The dynamic power region 701 and surrounding moat 705 can be any size or shape. In general, it may be preferred that the size of the dynamic power region 701 and surrounding moat 705 can be a size that will fit within the dimension of any frame style or shape. For example, for a lens frame having a vertical height of approximately 48 mm, the diameter of the dynamic power region 701 and surrounding moat 705 can have a diameter that is between 43 mm and 44 mm. For example, a lens frame having a vertical height of approximately 26 mm, the diameter of the dynamic power region 701 and surrounding moat 705 can have a diameter that is between 21 mm and 22 mm.

Figure 8:
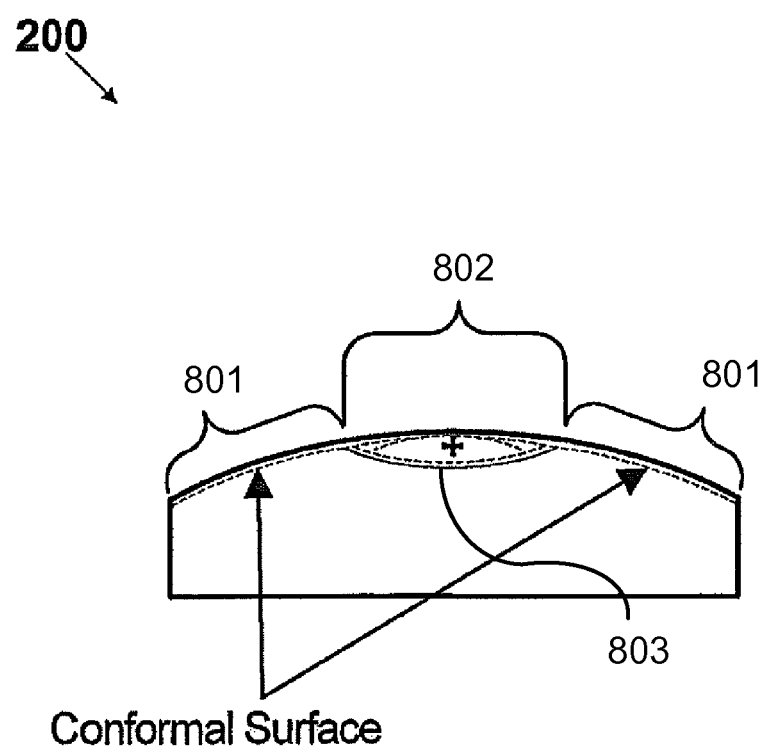
FIG. 8 show a cross section of an exemplary embodiment of a dynamic lens.

With reference to FIG. 8, the exemplary dynamic lens 200 is shown in a side view. The region 801 of the flexible element that is permanently bonded or adhered to the lens 200 is distinguished from the region 802 of the flexible element having a shape than can be adjusted based on the amount of fluid that is located between the region 802 of the flexible element and the portion 803 of the first surface of the first lens component. In some embodiments, and as shown in FIG. 8, when the amount of fluid between the region 802 of the flexible element and the portion 803 of the first surface is sufficiently great, an optical feature or features on surface 803 may not contribute to the optical power of that region of the lens 200 (for instance, when the indexes of refraction are matched). As the fluid in the area between the region 802 of the flexible element and surface 803 is removed or displaced, the region 802 of flexible element may move closer to, and eventually conform to, the portion 803 of the first surface.

Figure 9:
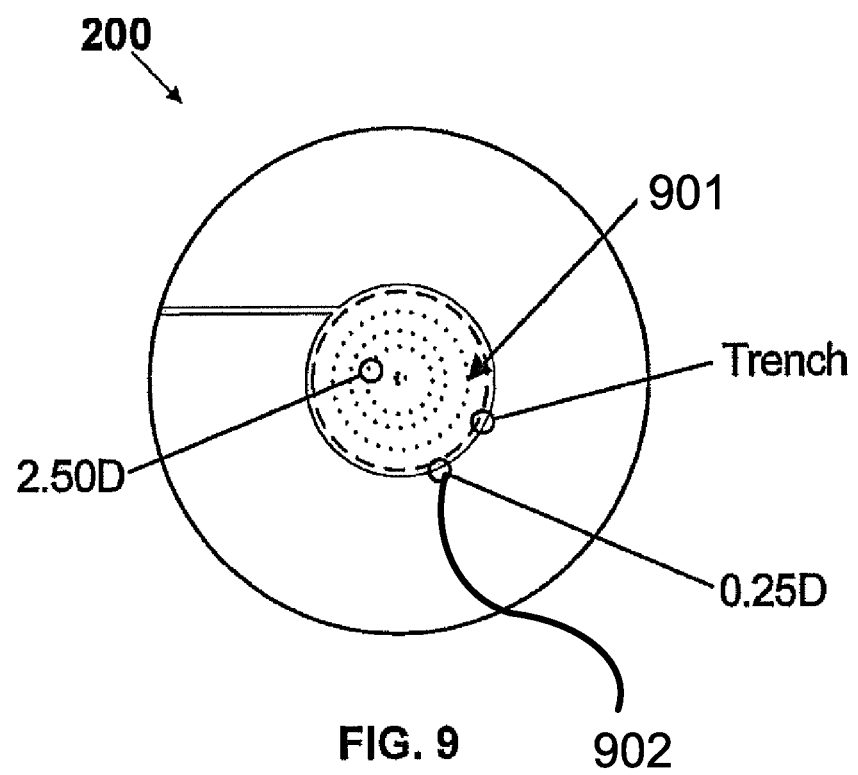
FIG. 9 show a front view of an exemplary embodiment of a dynamic lens.

With reference to FIG. 9, the exemplary dynamic lens 200 is shown. The exemplary lens 200 in FIG. 9 has a rotationally symmetric aspheric add zone 901. When exposed (e.g. when an amount of index matched fluid is sufficiently low), this add zone 901 shown in FIG. 9 can provide an add power of 2.50 D (although add zone 901 may have any value of add power). The rotationally symmetric aspheric add zone 901 can have a rotationally symmetric continuous optical power profile having a lower optical power at its periphery 902 than at its center. The periphery 902 may or may not have an optical power discontinuity (for example, it may have an optical discontinuity of 0.25 D as shown in FIG. 9). In some embodiments, a discontinuity of a dynamic lens 200 can be a discontinuity of slope or sag. It should be understood that a discontinuity of a dynamic lens 200 can be a power discontinuity having any optical power value. In some embodiments, the dynamic lens 200 shown in FIG. 9 may provide the distance and/or near optical power due, at least in part, to the shape of the first lens component (i.e. the substrate) comprising a bifocal surface curvature. That is, for example, when the fluid between the first surface of the first lens surface and a region of the flexible element is sufficiently low, the bifocal surface curvature on the first lens surface may provide the near and distance optical power.

Figure 10:
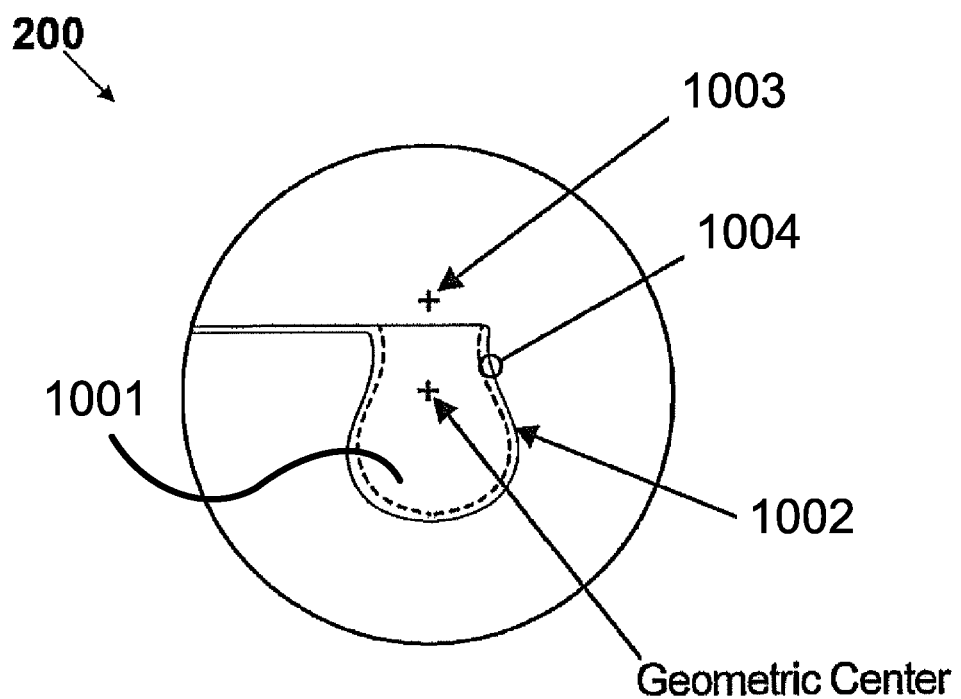
FIG. 10 show a front view of an exemplary embodiment of a dynamic lens.

With reference to FIG. 10, a front view of the exemplary dynamic lens 200 is shown. In this embodiment, the dynamic lens 200 is shown as having a dynamic power region 1001 with a shape that corresponds to the progressive addition surface located on the first surface of the first lens components that a region of the flexible element can conform to when the amount fluid between these components is sufficiently low so that the region of the flexible element conforms to the progressive addition surface. In some embodiments, the distance, intermediate, and/or near optical power (e.g. for a user of the dynamic lens 200) is created due to the progressive curve of the first surface when the amount of fluid between the first lens component and the flexible element is sufficiently low.

Continuing with reference to FIG. 10, similar to FIG. 7, a bond line 1002 shows the separation between the region of the flexible element that is adhered to the lens 200 (outside of the bond line 1002) and the region 1001 of the flexible element that is not adhered to the lens 200 (which is inside of the bond line 1002). The exemplary lens 200 shown in FIG. 10 may use the internal progressive surface (which may, for example, be located on the first surface at or below the fitting point 1003 of the first lens component) to provide the full add power of the lens 200. In some embodiments, the internal progressive surface can be in optical communication with another optical element of the lens (e.g., a progressive addition region positioned on the second (e.g. back) surface of the lens) such that internal progressive surface provides a first component of a total add power of the lens. That is, in some embodiments the progressive surface (which may, for example, be located on a first surface of a first lens component, e.g. surface 11 of FIG. 1) can be such that it provides a "full" optical add power or a "partial" optical add power. In some embodiments when the first surface provides a partial optical add power, another progressive surface may be free formed or otherwise provided on another surface (such as surface 12, which is the surface closest to the eye of the wearer as illustrated in FIG. 1) to allow for a combination of add power to provide full positive add power for the wearer.

In some embodiments, the dynamic power region 1001 of a dynamic lens 200 can be in optical communication with one or more optical elements such that the combined elements provide the desired optical power for a particular vision zone (e.g., either an intermediate or near vision zone). The one or more optical elements may comprise a portion of the dynamic lens 200 (such as a part of the second surface of the first lens component) or may be separate optical elements.

In some embodiments, a progressive addition region is a non-rotationally symmetric surface that does not add to the thickness to the first convex surface curvature, even if the progressive addition region is located on the first surface of the first lens component. In some embodiments where a progressive addition surface curvature is located on the first surface of the first lens component (e.g. first surface 11 in FIGS. 1-3) and where the optical feature is that of a progressive addition surface region and/or curvature, a moat or trench 1004 may be located along a portion of the dynamic optical region 1001 that is below that of the point where the progressive addition surface curvature contributes maximum optical add power. In some embodiments, (not illustrated in FIG. 10) the moat or trench 1004 is located "completely" below the point whereby the progressive addition surface contributes its maximum optical add power, while in other embodiments (also not illustrated in FIG. 10) the moat or trench 1004 is located "mostly" below the point whereby the progressive addition surface contributes its maximum optical add power. By "mostly," this means that the majority of the length the moat or trench may be located below the point where the progressive addition surface contributes its maximum optical add power. In some embodiments, the point at which the progressive addition surface contributes its maximum optical add power maximum may also correspond to the total add power of the lens.

With reference to FIG. 11, four examples of exemplary dynamic lens 200 are shown in various shapes and sizes to accommodate a wide range of lens and frame styles. That is, the in some embodiments, the dynamic lens 200 may be inserted or used with eyeglasses or spectacles. In some embodiments, the dynamic lens may be used in other applications, such as in an imaging apparatus, a camera, any systems that utilize and/or focuses lasers, and/or any other optical system that utilizes lenses. The dynamic lens 200 can be made to have any desired shape or size. The examples shown in FIG. 11 can be lenses for eyeglasses for a patient's right eye. A person of ordinary skill in the art would understand that any known means for shaping a lens may be used. Each of the dynamic power regions 1101 could have the same optical feature, regardless of the overall shape of the dynamic lens 200.

Figure 12:
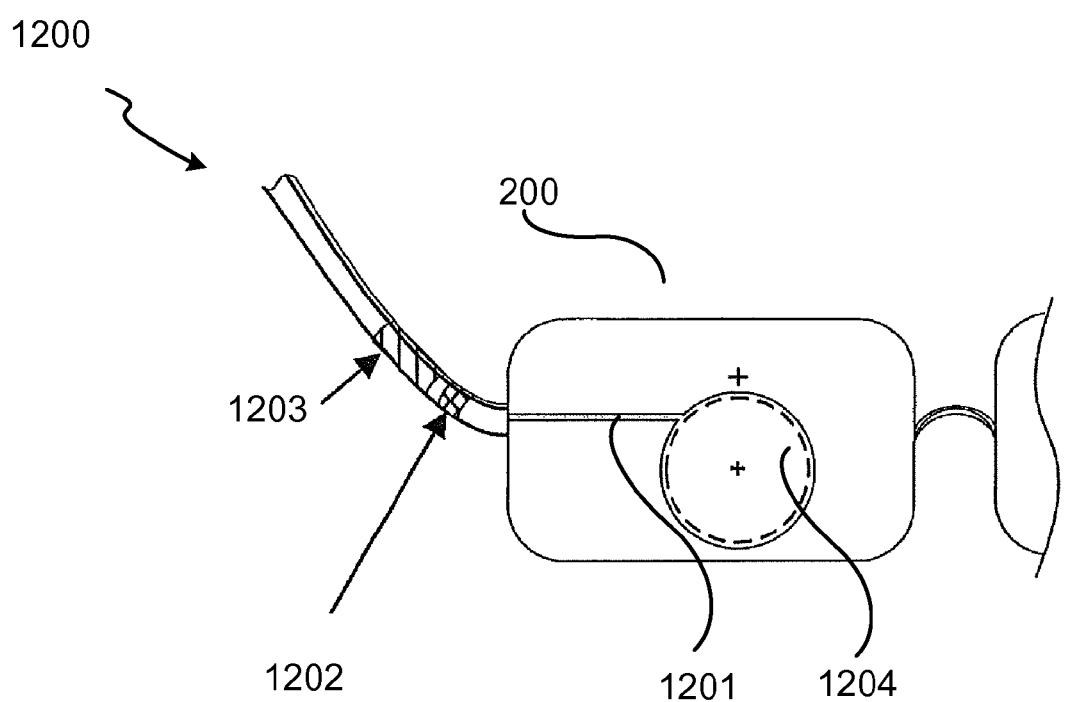
FIG. 12 show a diagram of a front view of an exemplary embodiment of a dynamic lens.

With reference to FIG. 12, an example of the exemplary dynamic lens 200 is shown positioned within an exemplary spectacle frame 1200. As shown in FIG. 12, a channel 1201 of the dynamic lens 200 is coupled to an actuator 1202 and reservoir 1203 positioned in or near a temple of the spectacle frame 1200. The actuator 1202 can use the channel 1201 to pump the fluid of the dynamic lens 200 into and out of the reservoir 1203 to dynamically alter the optical power provided by the dynamic lens 200. One skilled in the pertinent arts will appreciate that a variety of actuators can be used to help move or displace the fluid of the dynamic lens 200. For example, in some embodiments the dynamic lens 200 can use a mechanical actuator, electronic actuator, a fuel cell actuator or a manual actuator. The actuator may also be a syringe, plunger, pump that is mechanically (e.g., spring loaded), manually, electrically, or electro-mechanically moved or adjusted to move the placement of the fluid of the dynamic lens 200. In some embodiments, the dynamic lens 200 may have or be connected to multiple actuators 1202 and/or multiple reservoirs 1203. An air tight seal can be formed between the one or more actuators 1202, the one or more reservoirs 1203, and the one or more dynamic power regions 1204 (i.e., the regions that allow the fluid to enter and exit each component) to enable good flow of the fluid of the dynamic lens 200. Although illustrated in the context of spectacles or eyeglasses, it should be appreciated that any configuration of an actuator 1202 and reservoir 1203 may be used based on the application for which dynamic lens 200 is being used.

The example illustrated in FIG. 12 can be lenses for use in a patient's right eye. As noted above, the dynamic lens 200 can use one or more reservoirs 1203. Further, embodiments that use dynamic lens 200 in spectacles or frames are not limited to having the one or more reservoirs 1203 in the location shown in FIG. 12. For instance, one or more reservoirs 1203 can be positioned within the nose bridge of a frame housing a dynamic lens 200. Further, in some embodiments a dynamic lens 200 can use multiple reservoirs 1203 positioned in various locations in relation to the lens 200. For example, a first reservoir can be positioned in a temple and a second reservoir can be located in a nose bridge. Again, any suitable location for the actuator 1202 and the reservoir 1203 may be used.

With reference to FIG. 13, an example embodiment of the lens 100 is shown. The exemplary lens 100 in this illustration is shown as having an optical feature 14 on the first surface 11 (the front surface as shown) of the first lens component 10. In some embodiments, the optical feature 14 can be a constant optical power region (when no longer covered by the fluid 20 such that there is a sufficiently low amount of fluid 20 between a region of the flexible element 5 and the first surface 11) and can have a spherical or aspherical curvature that is different from the rest of the first surface 11. As such, in some embodiments the lens 100, when the first surface 11 is no longer covered by the fluid 20 such that there is a sufficiently low amount of fluid 20 between a region of the flexible element 5 and the first surface 11, can be a multifocal lens.

As shown in FIG. 13, the exemplary lens 100 is in a first state, whereby there is a sufficiently great amount of fluid 20 between the first surface 11 and a region of the flexible element 5, such that the optical feature 14 does not contribute to the optical power of the dynamic optical region. Light rays 101 that enter the lens 100 parallel are thereby shown as emerging from the lens substantially parallel. As described above, in some embodiments, even in this first stage, the lens 100 may have some optical power.

With reference to FIG. 14, the exemplary embodiment of lens 100 shown in FIG. 13 is now illustrated in a second state, whereby the amount of fluid 20 is sufficiently low so as to no longer separate the optical feature 14 from a region of the flexible element 5. As such, the region of the flexible element 5 has conformed in the dynamic optical power region 1401 to the shape of the optical feature 14 located on the first surface 11 of the first lens component 10. As shown in this embodiment, the lens 100 can provide an optical power in a lower portion of the lens 100 that is different from an optical power provided by an upper portion of the lens 100. This is illustrated in FIG. 14 by light rays 1402 that enter the lens in the dynamic optical power region 1401 and are refracted in accordance with the optical power as defined or contributed to by the optical feature 14. In contrast, light rays 1403 that enter the lens 100 in a different region are not refracted.

It should be noted that while flexible element 5 may be flexible, it may also be stretchable. That is, in some embodiments the flexible element 5 is only flexible, and in some embodiments the flexible element 5 may be stretchable and flexible. When flexible element 5 is stretched and/or flexed to conform to the shape of surface 11 and/or optical feature 14, the stretching can aid the fluid 20 to refill the chamber (i.e. the gap between the first surface 11 and the flexible element 5) of the lens 100 when the flexible element 5 is released and/or no longer conforms to the first surface 11.

Figure 15A:
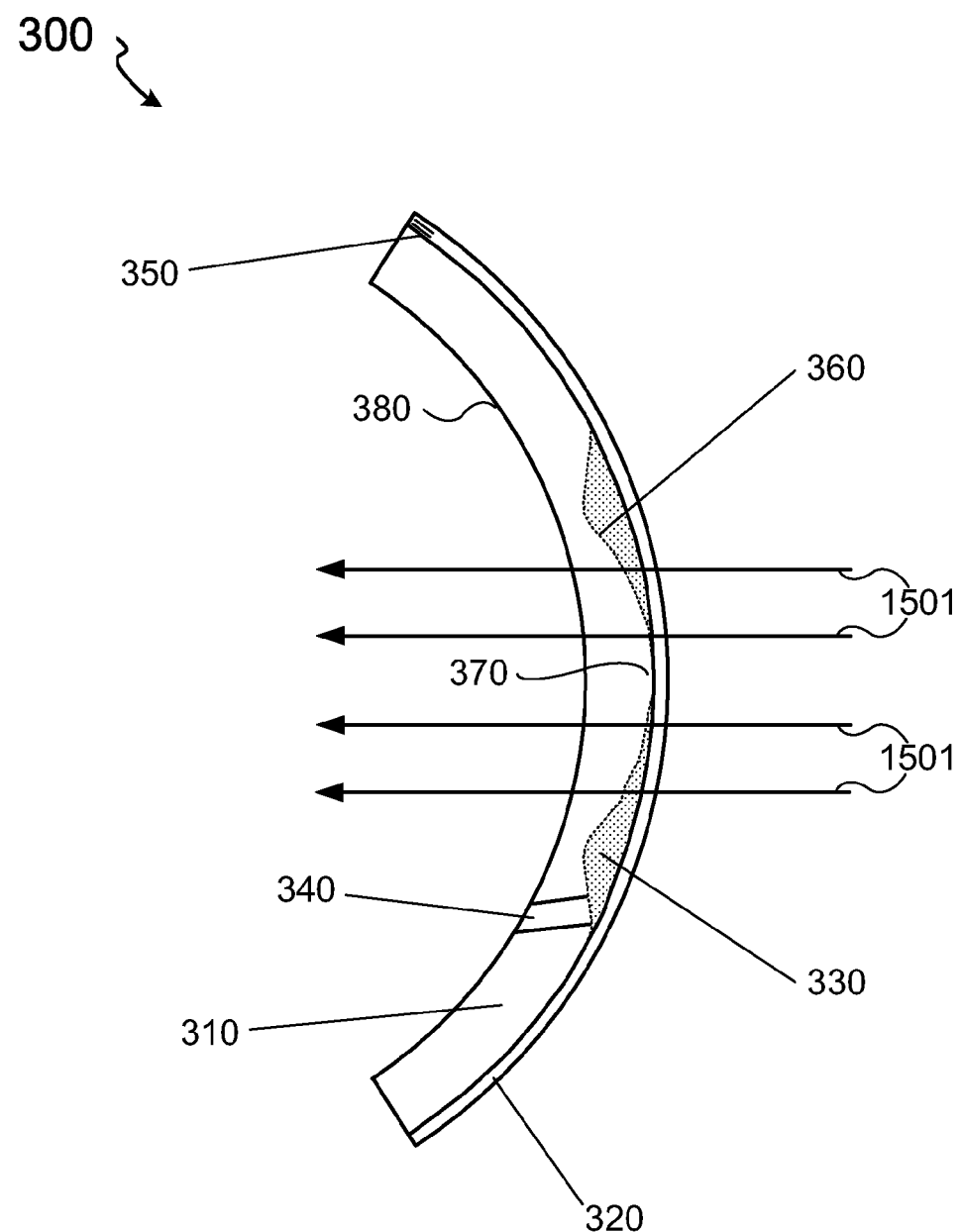
FIG. 15 shows two side views of an exemplary embodiment of a dynamic lens.
Figure 15B:
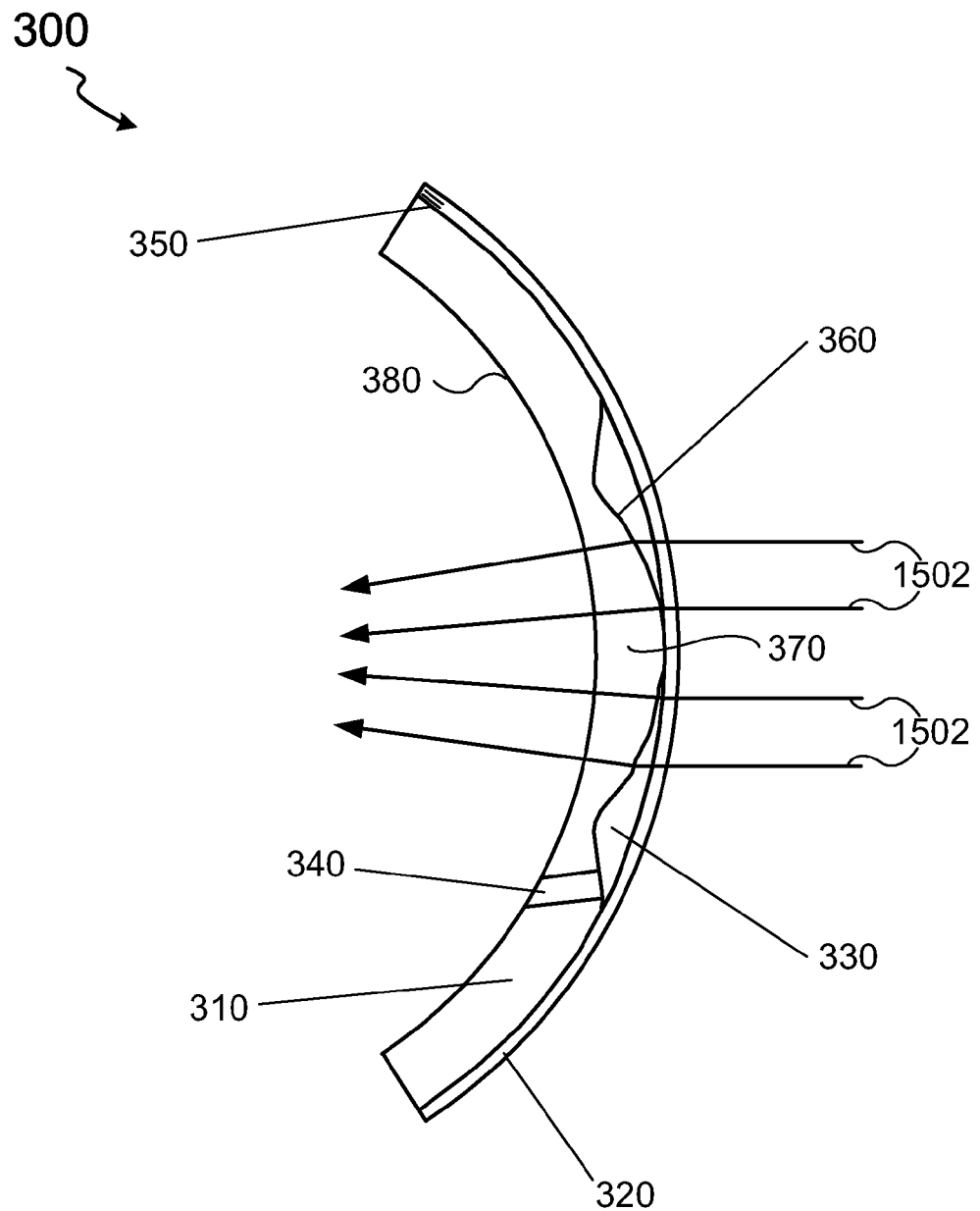

With reference to FIG. 15, another embodiment of an exemplary dynamic lens 300 is shown. FIG. 15(a) and FIG. 15(b) illustrate exemplary lens 300 in a first state (FIG. 15(a)) and a second state (FIG. 15(b)). That is, FIG. 15(a) shows the lens 300 when there is a sufficiently great amount of fluid 330 between the first surface 360 for the first lens component 310 and a third lens component 320 such that the optical feature 370 does not contribute to the optical power of the lens 300 (for embodiments where the index of refraction of the fluid 330 is substantially the same as the first 310 and third 320 lens components). In the embodiment illustrated, rather than a flexible membrane, the lens 300 may use a porous plug 350 to fill the region between the first 310 and third 320 lens components when the fluid 330 is substantially removed from the chamber. A channel 340 is also provided for removing or displacing the fluid 330. In this exemplary embodiment, the third lens component 320 may comprise a cover lens. As illustrated, in this exemplary embodiment, light rays 1501 that enter the lens 300 parallel, emerge from the lens 300 substantially parallel.

In contrast, FIG. 15(b) shows the exemplary lens 300 in a second state, whereby the fluid 330 has been substantially removed from the area between the first 310 and third 320 lens components. Air now fills this region (which may have entered through the porous plug 350) and the difference between the index of refraction of the air and the first 310 and/or third 320 lens components, along with the properties of the optical feature 370 located on the first surface 360, may create a positive optical power. This is illustrated by light rays 1502 entering the lens 300 in the dynamic optical region and being refracted by the optical power. In this embodiment, when the fluid 330 is pumped or otherwise applied between the first 310 and third 320 lens components, the optical power is eliminated (the air being displaced by the returning fluid 330 passes through the porous plug 350).

With reference to FIG. 16, an exploded view in cross-section of another embodiment of exemplary lens 300 is shown. In this embodiment, the lens 300 comprises a substrate 310 (e.g. a first lens component), outer rigid lid 320 (e.g. a third lens component), a fluid 330 (which may be indexed matched), and a flexible element 350 (e.g. a membrane). A fluid port 340 (e.g. a channel) allows pumping in and sucking out (or any other means of displacing) of the fluid 330. The first lens component 300 has a Thickness of T1, an inside Radius of Curvature R1, an Outside Radius of Curvature R2, and a Central Outside Radius of Curvature R3. When the value of R2 equals R1 plus T1, virtually zero optical power exists in the first lens component 300. As the Radius of Curvature of R1 is made shallower relative to the Radius of Curvature R2, greater positive optical power is added to the first lens component 300. Similarly, when the Radius of Curvature R2 is made steeper than Radius of Curvature R1, greater optical power is added to the first lens component 300. Radius of Curvature R3, when steeper than Radius of Curvature R1, adds positive optical power to first lens component 300 in the area of Radius of Curvature R3 (e.g. in this embodiment, the dynamic optical power region). As shown in FIG. 16, fluid 330, flexible element 350 and the third lens component 320 are placed a distance away from the first lens component 300 only for illustrative purposes for convenient and clearer viewing of these components. In this embodiment, these components are brought together as shown in FIG. 17.

Figure 17:
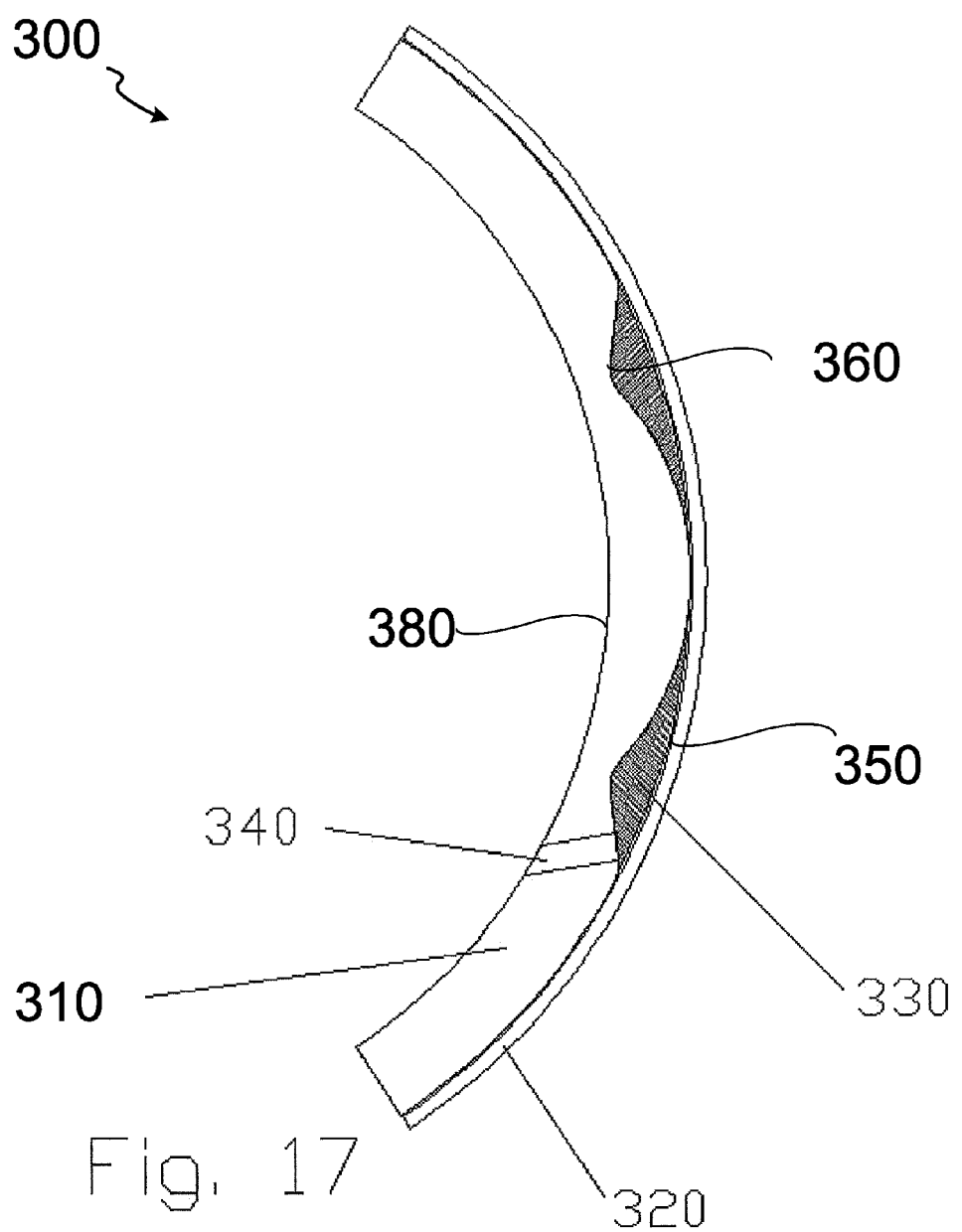
FIG. 17 shows a side view of an exemplary embodiment of a dynamic lens.

With reference to FIG. 17, the exemplary lens 300 is shown in cross-sectional view. The flexible element 350 is located between (i.e. sandwiched) the third lens component (e.g. an Outer Rigid Lid) 320 and the first lens component (e.g. a Substrate) 300, with fluid 330 (which may be index matched) pressing flexible element 350 against the third lens component 320. The inner Radius of Curvature of the third lens component 320 may provide the shape required for a region of the flexible element 350 to conform to and to provide the desired optical effect. That is, the third lens component 320 may serve as an optical power stop.

In the embodiment illustrated in FIG. 17, virtually zero optical power exists in this assembly when the fluid 330 is index matched and the curvature of the inner Radius of Curvature (i.e. the first surface) and the outer Radius of Curvature (i.e. the second surface) of the third lens component 320 matches the curvature of the second surface 380 of the first lens component 310. In some embodiments, the optical power stop created by the third lens component 320 may define an optical power for a viewer's distance vision. That is, similar to the first surface of the first lens component 310, the first surface of the third lens component 320 may comprise any optical feature. Thus, embodiments of the lens 300 when in the first state, as illustrated in FIG. 17, may provide a corrective optical power for any prescription need by a viewer, which may be based, in part, on the curvature of the first surface of the third lens component 320. Moreover, the outer surface (e.g. the second surface) of the third lens component may also comprise any optical feature and/or any curvature that may contribute to the optical power of the lens 300 (or a region thereof).

Embodiments that comprise a third lens component may also prevent the over pressurization of flexible element 350 by fluid 330 into an undesired shape. The third lens component 320 may further provide a protective layer over flexible element 350, which may prevent the flexible element 350 from damage from external forces. It may also be easier to replace the third lens component 320, rather than having to replace the flexible element 350, which thereby decreases maintenance costs.

Figure 18:
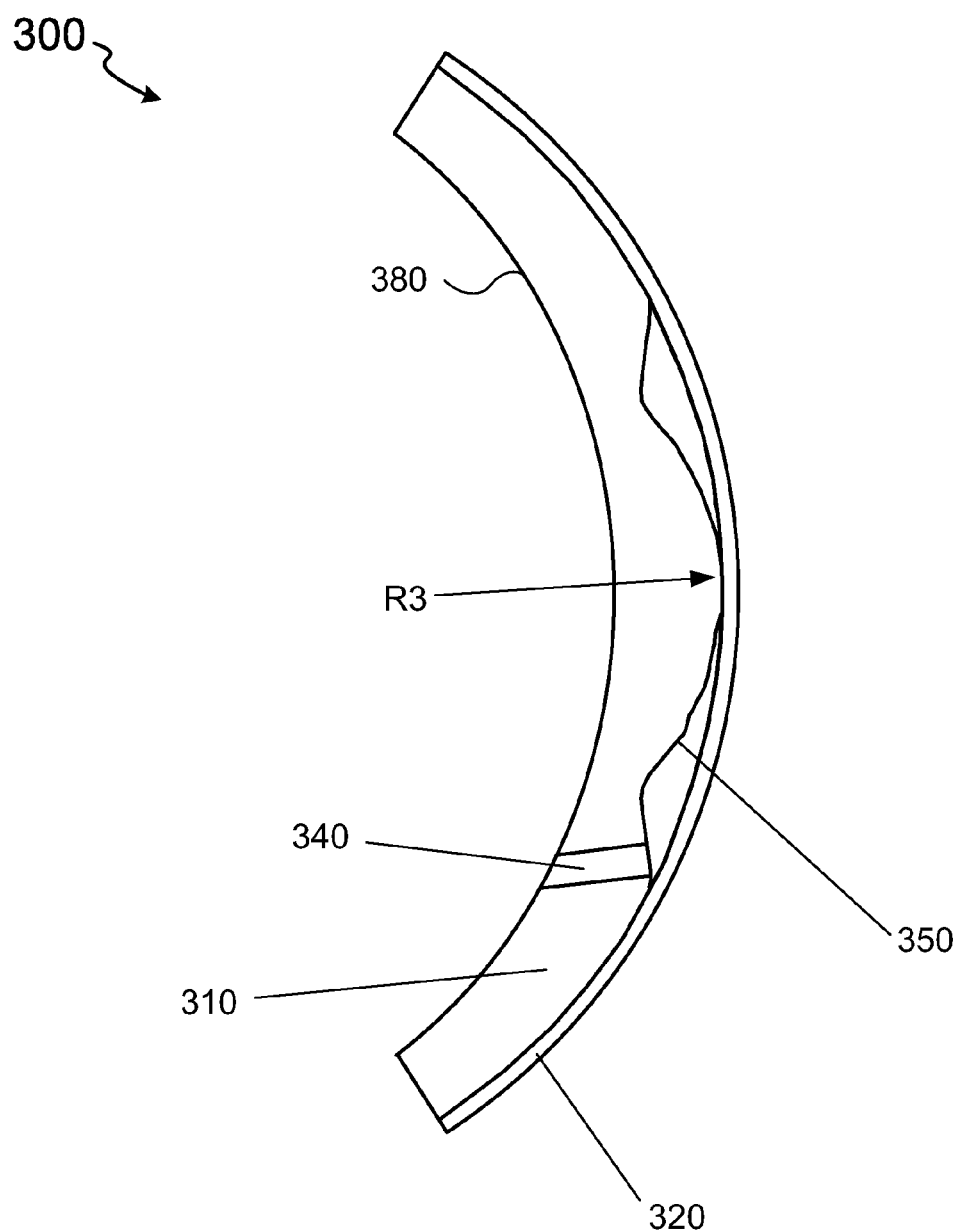
FIG. 18 shows a side view of an exemplary embodiment of a dynamic lens.

With reference to FIG. 18, the exemplary lens 300 shown in FIG. 17 is illustrated in a second state whereby the fluid 330 has been removed or displaced (e.g. sucked out) of the assembly through channel (e.g. port) 340. A region of the flexible element 350 is pressed against and/or conforms to the outer shape of first lens component 310. Air, or fluid, may be allowed to fill the space between the flexible element 350 and the third lens component 320 through an access port (not shown). In this embodiment as shown, positive optical power may created in the central section of first lens component 310 (the dynamic optical power region), in the area defined by Radius of Curvature R3. In some embodiments, the third lens component 320 and any optical feature on either the first or second surface (including the curvature of either surface) may also contribute to the optical power of the lens 100.

In some embodiments, rather than "sucking out" the index matched fluid 330 through channel 340, air or non-index-matched fluid may be forced into the gap shown between flexible element 350 and the third lens component 320 to expel the fluid 330 from the gap between flexible element 350 and the first lens element 310, forcing it to travel through channel 340 by positive pressure on the right side of channel 340 (i.e., pumping) rather than negative pressure on the left side of channel 340 (i.e., sucking). This will be discussed in more detail with reference to FIG. 21 below.

Figure 19:
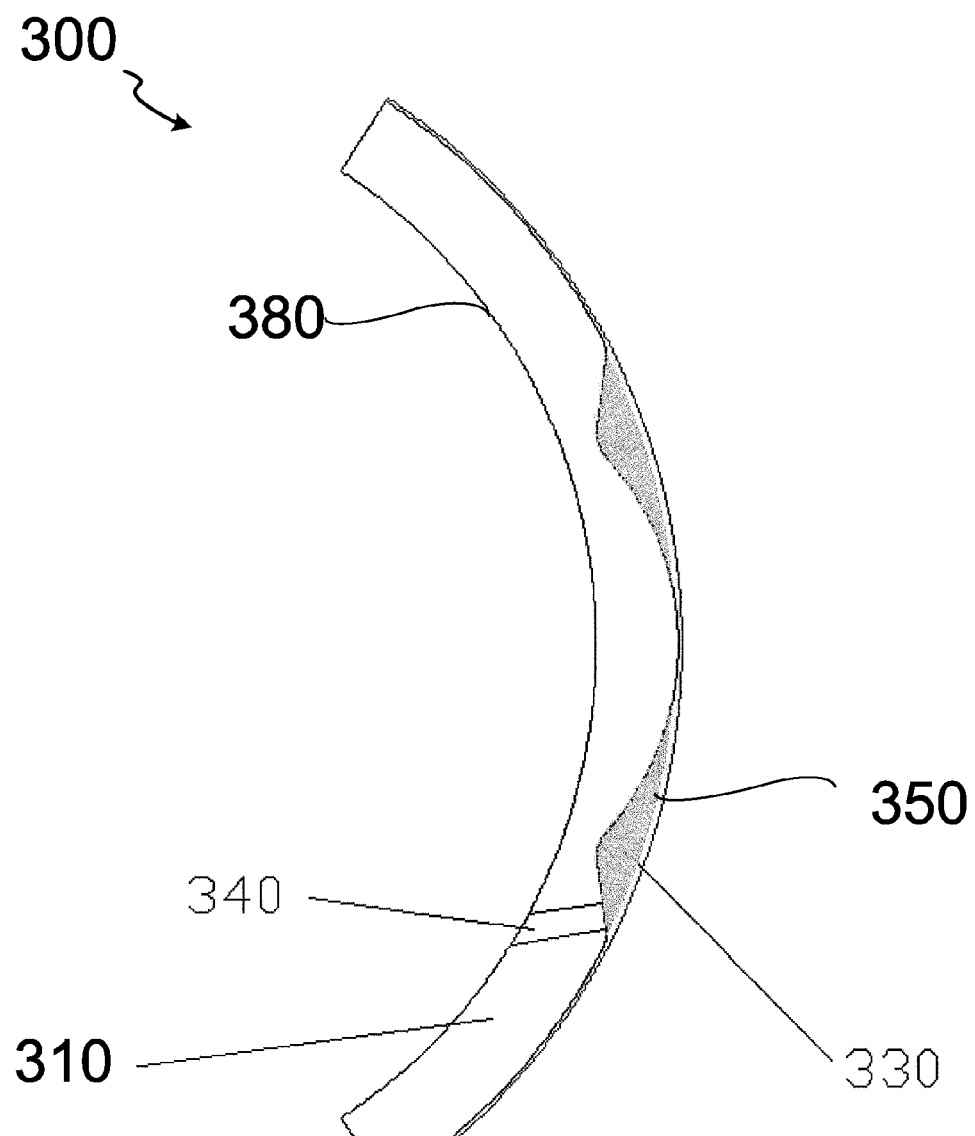
FIG. 19 shows a side view of an exemplary embodiment of a dynamic lens.

With reference to FIG. 19, an embodiment of exemplary lens 300 is shown. In this embodiment as shown in FIG. 19, the flexible element 350 is the outermost optical element without a protective lid or other third lens component. In the embodiment shown, the fluid 330 (which may be index matched) inflates the flexible element 350 into a spherical shape such that no optical power exists in the assembly. That is, the outer curvature of flexible element 350 matches the curvature of the second surface (e.g. back surface as shown) of the first lens component 310. As fluid 330 is removed from the gap between the flexible element 350 and the first lens component 310, the shape of the curvature of the flexible element 350 may begin to change, thereby changing the optical power of the dynamic optical power region of lens 300 (e.g. tuning the optical power of lens 300 toward the optical power provided by the first surface of the first lens component 310). This tuning may continue until substantially all of the fluid 330 is removed from the gap, and the flexible element 350 (or a region thereof) thereby conforms to the first surface of the first lens component 310 (which thereby serves as the optical power stop).

Figure 20:
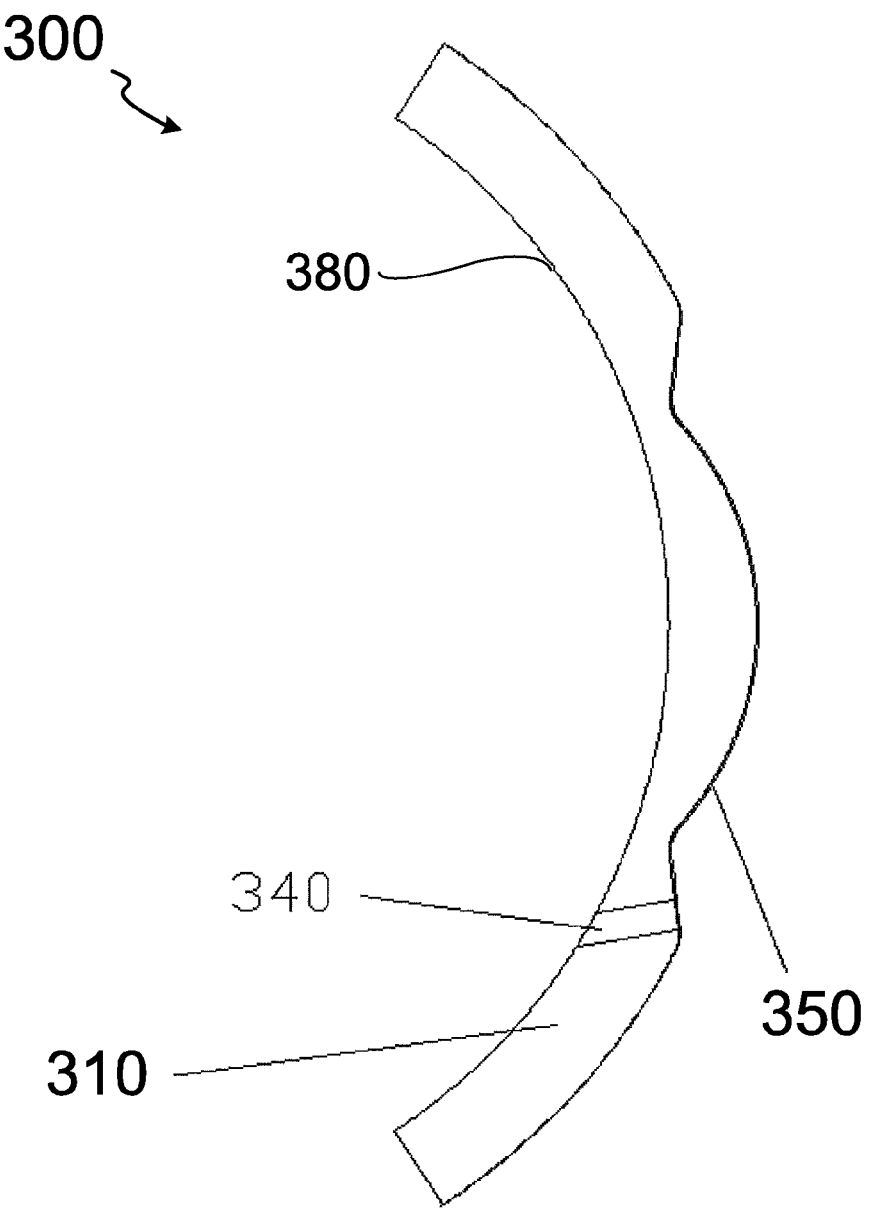
FIG. 20 shows a side view of an exemplary embodiment of a dynamic lens.

With reference to FIG. 20, the exemplary lens 300 shown in FIG. 19 is illustrated in a second state. That is, FIG. 20 shows flexible element 350 conforming to the shape of first lens component 310 after fluid 330 has been sucked out (or otherwise removed or displaced) through channel (i.e. port) 340. In this state, positive optical power has been created in the central zone (i.e. the dynamic optical power region) where the steeper radius of curvature exists. In some embodiments, the flexible element 350 may also be a semi-rigid material that is sufficiently flexible to allow it to conform to the shape of the first lens component 310 when the fluid 330 is removed or displaced, yet resilient enough to return to its original spherical shape when the fluid 330 is returned into the gap between the first lens component 310 and the flexible element 350, without requiring fluid 330 to inflate it to the shape with positive pressure. In some embodiments, if the flexible element 350 is over-pressurized by fluid 330, a negative optical power may be created in the region that the flexible element 350 inflates beyond the normal radius. That is, if the flexible element 350 is over pressurized so that the radius of curvature of its outer surface is reduced, this region may have an effect on the optical power of lens 300. Although in describing exemplary lens 300 in this embodiment the first lens element 310 has been described as having zero optical power, it may be desirable to build into the first lens component 310 a fixed positive or negative optical power, which can be accomplished by varying the ratio of the inner and outer radius of curvatures. In such embodiments, even in the first state illustrated in FIG. 19, the lens 300 will thereby have some optical power.

As noted above, the flexible element may comprise a which in some embodiments, by way of example only, may comprise biaxially oriented polyethelene terephthalate (available under the trade name Mylar) or urethane. However there are many other materials which have the appropriate transparency, toughness, and refractive index which can be used as the flexible element.

Figure 21:
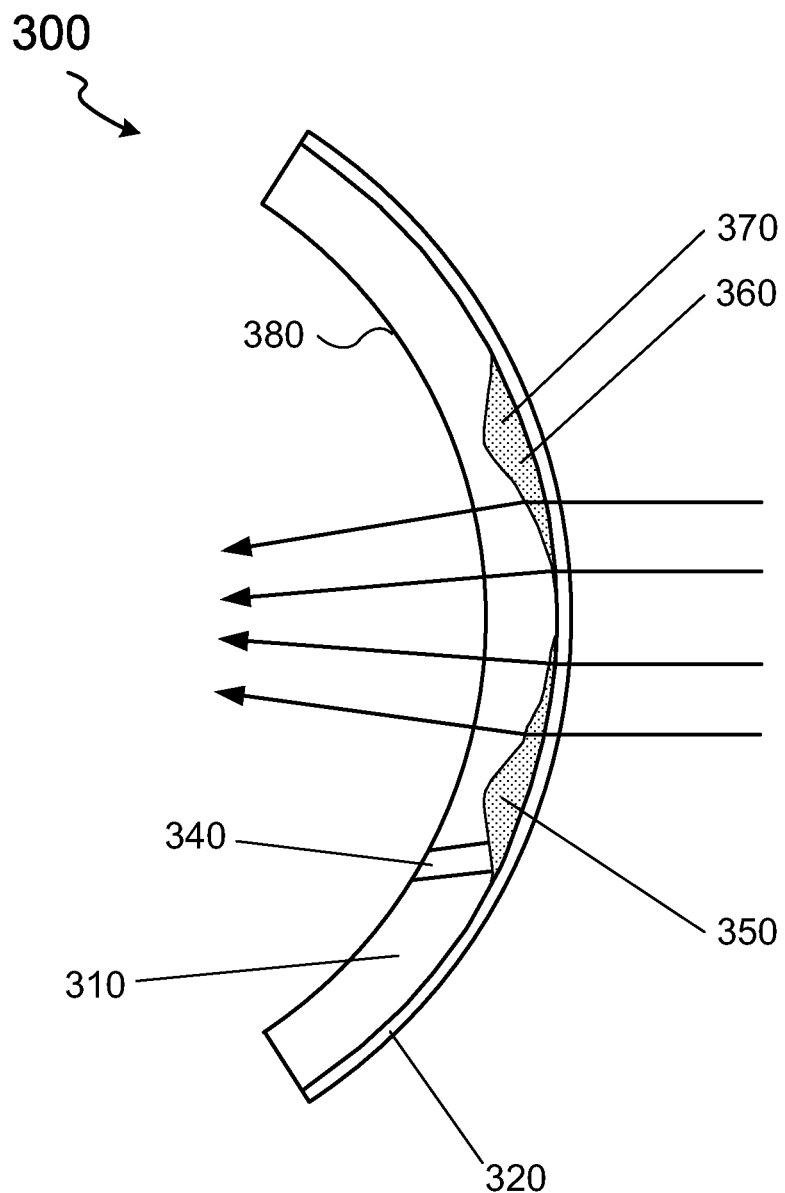
FIG. 21 shows a side view of an exemplary embodiment of a dynamic lens.

With reference to FIG. 21, an embodiment of dynamic lens 300 is shown whereby rather than allowing air to fill the space once occupied by the index matched fluid 330, a second optical fluid 370 having a different index of refraction may be applied to (e.g. pumped into) the cavity instead. By varying the index of refraction of the second optical fluid 370 (that is, the second optical fluid may have an index of refraction that does not match the index of refraction of the first lens component), the optical power of the lens assembly may be varied. This may permit the same lens components to be used in different lenses, with each of the lenses having a different optical power. That is, the optical power of the same lens (e.g. having the same first lens component, second lens component, etc.) may be "programmed" by selecting a different index of refraction for the second optical fluid.

In some embodiments, a flexible element 350 may also be used. The flexible element 350 may be used to keep contamination and bubbles out of the fluids, and also may serve to keep the two optical fluids apart. In some embodiments, flexible element 350 does not create the optical power of the lens, but it is the shape of first surface 360 (along with any optical features that may be located thereon), coupled with the index of refraction difference between the first lens component and the second optical fluid at the first surface 360 (or lack thereof) that creates the optical power, which may be thereby controlled by the index of refraction of the fluids. In some embodiments, the flexible element 350 may also have a different index of refraction than the second optical fluid that may contribute to the optical power of the lens 300. In some embodiments, the second optical fluid 370 may be applied to the gap between the flexible element 350 and the third lens component 320.

In operation, in some embodiments the lens 300 may be in a first state whereby the first optical fluid 330 substantially fills the gap between the first lens surface 310 and the flexible element 350 (or a region thereof). In some embodiments, fluid 330 may be index matched to the first lens component, as described above, however, it is not so limited and may have any index of refraction. In this first state, in some embodiments the amount of the second optical fluid 370 between the flexible element 350 and the third lens component 320 may be sufficiently low. In some embodiments, in this exemplary first state the flexible element 350 or a region thereof may conform to the first surface of the third lens component 320 (e.g. the curvature of the inner Radius of Curvature of the third lens component 320 as shown in FIG. 21), which may provide a desired optical power for the lens 300 (e.g. an optical power for distance vision correction).

In a transitional state, the first optical fluid 330 (or an amount thereof) may be displaced from the area between the first lens surface 310 and the flexible element 350. The second optical fluid 370 may be applied to the region between the flexible element 350 and the third lens component 320. In some embodiments, the first optical fluid 330 may be displaced or removed at approximately the same time as the second optical fluid 370 is applied. In some embodiments, the application of the second optical fluid 370 forces or contributes to the displacement of the first optical fluid 370. That is, in some embodiments the application of the second optical fluid may apply pressure to the flexible membrane 350, which may in turn displace the first optical fluid 330 from the region between the flexible element 350 and the first surface 360.

In some embodiments, in a transitional stage, the lens 300 may comprise a sufficiently great amount of the first optical fluid 330 between the first lens component 310 and the flexible element 350, and a sufficiently great amount of the second optical fluid 370 between the flexible element 350 and the third lens component 320. In some embodiments, a transitional stage may provide a desired optical power for vision correction of a wearer. Moreover, as noted above, in some embodiments, the transitional stage may comprise the ability to tune the lens between a first optical power and a second optical power, which may be provided by the first 310 and third lens components 320, respectively. Preferably, the second optical fluid 370 may have an index of refraction that is different than the index of refraction of first the first optical fluid 330. In some embodiments the flexible element 350 may have an index of refraction that is different from the index of refraction of the second fluid 370. In some embodiments, the second optical fluid 370 may have an index of refraction that is substantially the same as the index of refraction of the first lens component and/or the same as the third lens component 320. As would be understood by one of skill in the art, by varying the index of refraction of the various components and fluids of the lens 300, different optical powers may be achieved based, in part, on the refraction of the light waves at the interfaces.

In a second or final state, the amount of fluid between the first lens component 310 and the flexible element 350 may be sufficiently low, while the amount of the second optical fluid 370 between the flexible element 350 and third lens component 320 may be sufficiently great. In some embodiments, a region of the flexible element 350 may conform to a portion of the first surface 360 of the first lens component 310. In some embodiments, where the index of refraction of the second optical fluid 370 is substantially the same as index of refraction of the first lens component 310, any optical feature provided on the first surface 360 of the first lens component 310 may be masked or hidden (that is, the first surface 360 may not contribute to the optical power of the lens 300 in the dynamic optical power region). In some embodiments, where the second optical fluid 370 has an index of refraction that is substantially the same as the third lens component 310, any optical feature on the first surface of the third lens component 320 may be masked or hidden (that is, the first surface of the third lens component 320 may not contribute to the optical power of the lens of the dynamic optical power region).

While some embodiments have been described and illustrated as comprising two optical stops (e.g. FIGS. 16-21) with a particular optical feature or features, as was stated above this was for illustration purposes only. It should be understood that any and all surface designs of the first surface (e.g. the surface that defines an optical power stop, such as surface 360 in the described embodiments) of the first lens component may be utilized to provide any desired optical power in embodiments that comprise a third lens component (e.g. the cover lens or top lid 320 as shown in FIGS. 16-21). Similarly, any and all surface designs may be used for any of the other surfaces of the dynamic lens 300 (e.g. the surface of inner curvature of the third lens component 320) to provide any desired optical power, or contribute to an optical power of the dynamic lens 300.

As noted above, the embodiments illustrated in FIG. 1-21 and described herein were for illustration purposes only, and are not meant to be limiting. For instance, it should be understood that any of the embodiments in FIG. 1-21 can also provide only a partial positive add power in a dynamic optical region. In some embodiments, a partial add power progressive surface can also be free formed on a surface that is not adjacent to the flexible membrane (e.g. the second surface 12 as shown in FIGS. 1-3 and 13-14; the surface 380 shown in FIGS. 15-21, or any other suitable lens component or surface in a dynamic lens), which may comprise a surface of a lens component closest to the eye of a viewer. In some embodiments, this permits a combination of add powers to provide full positive add power for the wearer.

Reference will now be made to the elements as described in FIG. 1 for illustration purposes only, but the principles discussed may be equally applicable to other embodiments. Embodiments of the invention may allow for the processing of a dynamic lens by way of free forming, digital surfacing, conventional surfacing and polishing of a lens blank that comprises a fluid into that of a customized lens having a specific prescription that is prescribed or measured by an eye care provider for a specific patient wearer of the inventive lens. Again, with reference to the elements described in FIG. 1 (for illustration purposes), embodiments of a dynamic lens can be made such that first lens component (e.g. first lens component 10) can be that of a semi-finished lens blank having the desired finished curve of first surface 11 on the same side of the lens blank as that of the flexible element 5, and having a non-finished surface curve on the second surface (e.g. back surface as shown) 12. Although for illustration purposes the desired finished curve was shown on the convex side and the non-finished surface curve was shown on the second surface 12 of the first lens component 10, embodiments can be reversed such that the finished curve is located on the second surface 12 along with flexible element 5, and the non-finished curve may be located on first surface (e.g. a front surface) 11.

In some embodiments, the flexible element 5 may be adhesively bonded to the finished surface of the lens component 10 (which can also be referred to as a lens blank if finished on both surfaces or semi-finished lens blank if finished on only one surface and unfinished on the opposing surface) with the exception of a region that covers optical feature 14. In some embodiments, the semi-finished lens blank can be blocked by way of convention blocking and the non-finished surface can be free formed, digitally surfaced, or surfaced and polished to the appropriate curvature such to give the dynamic lens the intended prescription when flexible membrane 5 is in a relaxed non-conformal state (e.g. the first state described in FIG. 1) and also when flexible membrane 5 (or a region thereof) is in a non-relaxed conformal state (e.g. the second state described in FIG. 3). In this manner, embodiments of the dynamic lens may, for instance, provide correction for a viewer for both near and distant vision. Moreover, by utilizing an optical power stop of the first lens component, and a second optical power stop at the third lens component (as described with reference to FIGS. 17 and 18), the corrective optical power can be readily and accurately returned to in the fluid lens.

Embodiments may allow for the multifocal power of a dynamic lens to focus for near vision, for instance, at 15"-20", and more preferably at 16" to 18" when flexible element 5 is in a non-relaxed conformal state. As described above, by conformal state the means that the flexible element 5 (or a region thereof) mostly conforms to the shape of the first surface 11, which may include optical feature 14 (shown, for example in FIGS. 13 and 14). In some embodiments, when flexible element 5 is relaxed, it may provide the distance vision corrective power at optical infinity (e.g. 20 feet or greater from the wearer) for the wearer of the dynamic lens. This may be made possible, in part, when fluid 20 is index matched so as to hide or mask optical feature 14 when the membrane is relaxed and not in a conformal state.

Also in some embodiments, depending upon the design of the first surface 11 and optical feature 14 (shown in FIGS. 13 and 14), it may be possible when flexible element 5 (or a region thereof) is in the conformal non-relaxed state that both the near vision distance (e.g for objects at a distance of 15" to 20") and also objects at an intermediate vision distance (e.g. about 20" to 5 feet) to all be in focus. In some embodiments, objects at all distances (near vision distance, intermediate vision distance, and far distance vision of optical infinity) may all be corrected and in focus at the same time, but in different regions or zones of the inventive lens. This may comprises utilizing multiple optical features 14 at the different locations of the first surface of lens 11 of the first lens component.

In some embodiments, when the dynamic lens is in the relaxed/non-conformal state, the dynamic lens may provide the optical power required to correct the distance and/or the intermediate vision needs of the wearer. This can be accomplished by, for example, utilizing a partial add power progressive addition surface free formed or digitally surfaced on the surface of the lens opposite that of the surface comprising flexible element 5 (e.g. the back surface or second surface 12 of the first lens component 10 and/or a surface of the third lens component). The term partial add power progressive addition surface is a progressive addition surface that does not provide the full add power needed of the wearer to see clearly at near distance. In some embodiments, the external surface curvatures of first lens component 10 (e.g. the second surface 12) can be fabricated to allow for distance and/or intermediate vision correction when the flexible element 5 (or a region thereof) is in the relaxed/non-conformal state, and near vision correction when in the non-relaxed/conformal state. It should be understood by one of ordinary skill that any combination of correction for near, intermediate, and far distance may be achieved in any of the conformal and non-conformal states based on the principles discussed herein utilizing, for example, shaping the optical properties of the surfaces of the first, second, and/or third lens components, or other optical features of the dynamic lens.

Embodiments allow for the fabrication of any and all optical prescriptions (including the fabrication of sphere, cylinder, prism, etc.) needed for a patient's vision correction. Those skilled in the art will readily understand this provides for the correction for astigmatism at any axis, as well as the spherical power needs, or a combination of both for the patient/wearer. Also as shown for example in FIG. 11, the dynamic lens can be edged and mounted into most any size and or shape eyeglass frame. In some embodiments, the first lens component 10 can be made of any material, so long as the refractive index of fluid 20 matches the index of the first lens component 10. For instance, the index of refractions may be substantially the same (e.g. within 0.05 units). Embodiments may thereby allow for material independence for the dynamic lens and therefore allow for the fabrication of a family of dynamic lenses, each having difference thicknesses and or optical properties for a given prescription. That is, for instance, the dynamic lens can comprise, by way of example only: CR 39 (1.49 index), Polycarbonate (1.60 index), MR 20 (1.60 index), MR10 (1.67 index), and/or Mitsui (1.74 index). As known in the optical industry, each of these materials represents certain advantages and also disadvantages and therefore the eye care provider may prescribe and/or recommend to the patient or wearer of the inventive lens the material combination they would prefer the patient or wearer to have. In embodiments, when tinting the dynamic lens a cover may be added to that of the surface comprising the flexible membrane 5. In some embodiments a cover 320 (e.g. the third lens component as illustrated in FIG. 16) can be hard coated and tinted. In some embodiments whereby cover 320 is not present, a temporary cover may be added to prevent the tint from penetrating into that of the flexible element 5. The tint may then be absorbed into the second surface of the dynamic lens and/or the side opposite flexible element 5.

As noted above, each of the dioptric powers, curvature radii, any dimension, and refractive index provided herein as examples are just examples only and are not intended to be limiting. Embodiments disclosed herein can provide any and all distance vision corrective optical power and add optical power needed or required for the wearer's optical needs. This can be accomplished, for example, by choosing the proper curves required of a first (e.g. front) surface, a second (e.g. back) surface, external surface curve of any included optical feature, and the appropriate thickness and refractive index as needed for the first lens component. Further and as noted above, embodiments of the dynamic lens can be that of a lens, a lens blank that is finished on both sides, or a semi-finished lens blank that must be one of free formed or digitally surfaced, or surfaced and polished into a final finished lens.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment can be combined with one or more features of any other embodiment without departing from the scope of the invention.

A recitation of "a", "an" or "the" is intended to mean "one or more" unless specifically indicated to the contrary

What is claimed is:

1. An optical system comprising:
    a first lens component having a first surface and a second surface, at least the first surface shaped to provide optical power;
    a transparent flexible element;
    a transparent fluid, wherein the fluid may be applied between at least a portion of the first lens component and at least a portion of the flexible element; and
    a pumping mechanism configured to adjust an amount of the fluid in a space between the first surface and the flexible element;
    wherein the flexible element comprises a first region, wherein the first region is configured to conform to the first surface of the first lens component when an amount of fluid between the first surface of the first lens component and the first region is sufficiently low;
    wherein the first region does not conform to the first surface of the first lens component when an amount of fluid between the first surface of the first lens component and the first region is sufficiently great; and
    wherein the first surface provides an optical power with the first region conforming to the first surface of the first lens component, and the optical power is reduced with the first region not conforming to the first surface of the first lens component.

2. The system of claim 1, wherein said first lens component includes a multi-focal surface included in a first optical feature.

3. The system of claim 2, wherein the first region conforms to the first optical feature when an amount of fluid between the first optical feature and the first region is sufficiently low; and
    wherein the first region does not conform to the first optical feature when an amount of fluid between the first optical feature and the first region is sufficiently great.

4. The system of claim 2, further comprising:
    a first dynamic optical power region;
    wherein the fluid has an index of refraction that is substantially similar to the index of refraction of the first lens component such that the first optical feature does not contribute to the first dynamic optical power region when an amount of the fluid between the first optical feature and the first region is sufficiently great.

5. The system of claim 1, wherein the first surface of the first lens component defines a first optical power stop.

6. The system of claim 5, wherein the first optical power stop defines a near vision optical power.

7. The system of claim 4, wherein the first dynamic optical power region is defined by the first optical feature when the fluid between the first optical feature and the first region is sufficiently low.

8. The system of claim 4, wherein the first dynamic optical power region is tunable such that when an amount of fluid between the first optical feature and the first region is sufficiently low; the dynamic optical power region is defined by the first optical power stop; and as the amount of fluid between the first optical feature and the first region is increased, the dynamic optical power region tunes away from the first optical power stop.

9. The system of claim 4, wherein a decrease in the volume of fluid between the first lens component and the first region increases a positive optical power of the dynamic optical power region.

10. The system of claim 4, wherein a decrease in the volume of fluid between the first lens component and the first region decreases a positive optical power of the dynamic optical power region.

11. The system of claim 1, wherein the shape of at least a portion of the flexible element is adjustable based on the amount of fluid between the first lens component and the flexible element.

12. The system of claim 11, wherein the flexible element comprises a flexible membrane.

13. The system of claim 1, wherein at least a portion of the flexible element is stretchable.

14. The system of claim 1, wherein the first lens component has a first index of refraction, the flexible element has a second index of refraction, and the fluid has a third index of refraction.

15. The system of claim 14, wherein the first index of refraction is substantially the same as the second index of refraction.

16. The system of claim 14, wherein the first index of refraction is substantially the same as third index of refraction.

17. The system of claim 14, wherein the first, the second, and the third index of refraction are substantially the same.

18. The system of claim 2, wherein the optical feature comprises any one of, or some combination of, the following:
    a progressive optical power region;
    a bifocal;
    a trifocal;
    an aspherical optical feature;
    an aspheric region;
    a rotationally symmetric optical feature; and
    a non-rotationally symmetric optical feature.

19. The system of claim 1, further comprising:
    a second lens component having a first surface and a second surface;
    wherein the first lens component and the second lens component are positioned such that a gap exists between the first surface of the first lens component and the first surface of the second lens component;
    wherein at least a portion of the flexible element conforms to at least a portion of the first surface of the second lens component when an amount of the fluid substantially fills the gap between at least a portion of the first lens component and at least a portion of the second lens component.

20. The system of claim 19, wherein the first surface of the second lens component defines a second optical power stop.

21. The system of claim 20, wherein the second optical stop power stop is for a distance vision optical power.

22. The system of claim 1, wherein the first surface includes a plurality of optical features located on different regions.

23. The system of claim 2, wherein the multi-focal surface comprises a progressive optical power region.

24. The system of claim 1, wherein a multi-focal surface is disposed at least partially in optical alignment with the first region of the flexible element such that the first region of the flexible element conforms to the multi-focal surface when an amount of fluid between the first optical feature and the first region of the flexible element is sufficiently low, and the multi-focal surface provides an optical stop having optical power in the first region.

25. An optical system comprising:
    a lens component having a first surface shaped to provide optical power;
    a transparent flexible element;
    a transparent fluid having an index of refraction that is different from the index of refraction of air;
    a pumping mechanism configured to pump said transparent fluid;
    a fluid storage reservoir;
    wherein said transparent fluid may be added into a space between said first surface and said flexible element, and subtracted from said space and transferred into said storage reservoir by said pumping mechanism;
    wherein said flexible element is not in contact with said first surface when said fluid is added in said space, and flexible element is in contact with said first surface when said fluid is subtracted from said space by said pump;
    wherein when said flexible element is in contact with said first surface, the difference in the indexes of refraction at the optical interface between said first surface, said flexible membrane and air is of one value;
    wherein when said flexible element is not in contact with said first surface, the difference in the indexes of refraction at the optical interface between said first surface and said fluid is of a different value;
    whereby the optical power of said first surface may have two discreet optical powers.

* * * * *